United States Patent
Petrone et al.

(10) Patent No.: US 9,421,526 B2
(45) Date of Patent: *Aug. 23, 2016

(54) CATALYTIC SURFACES AND COATINGS FOR THE MANUFACTURE OF PETROCHEMICALS

(71) Applicant: BASF Qtech Inc., Ontario (CA)

(72) Inventors: Sabino Steven Anthony Petrone, Edmonton (CA); Robert Leslie Deuis, Edmonton (CA); Fuwing Kong, Edmonton (CA); Yan Chen, Sherwood Park (CA)

(73) Assignee: BASF QTECH INC., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,678

(22) Filed: Nov. 4, 2014

(65) Prior Publication Data

US 2015/0057148 A1  Feb. 26, 2015

Related U.S. Application Data

(63) Continuation of application No. 13/906,865, filed on May 31, 2013, now Pat. No. 8,906,822.

(60) Provisional application No. 61/654,659, filed on Jun. 1, 2012.

(51) Int. Cl.
*B01J 21/00* (2006.01)
*B01J 21/18* (2006.01)
(Continued)

(52) U.S. Cl.
CPC ........... *B01J 27/224* (2013.01); *B01J 23/8892* (2013.01); *B01J 27/22* (2013.01);
(Continued)

(58) Field of Classification Search
CPC .......... B01J 21/00; B01J 21/18; B01J 23/02; B01J 23/06; B01J 23/26; B01J 23/30; B01J 23/34; B01J 23/40; B01J 23/74; B01J 23/755; B01J 23/8892; B01J 35/002; B01J 35/0006; B01J 37/0244; B22F 1/00; B22F 1/02; C22C 29/02; C25D 5/10; Y10T 428/12771; Y10T 428/12778; Y10T 428/12486
USPC ................... 502/183, 185, 241; 419/19, 35; 428/615, 655, 656
See application file for complete search history.

(56) References Cited

U.S. PATENT DOCUMENTS 4,297,150 A  10/1981  Foster et al.
4,298,661 A  11/1981  Ikeno et al.
(Continued)

FOREIGN PATENT DOCUMENTS

CA  2227396 A1  2/1998
CN  1131583  12/2003
(Continued)

OTHER PUBLICATIONS

International Search Report issued in related International Application No. PCT/US2013/043718 on Sep. 4, 2013.
(Continued)

*Primary Examiner* — Patricia L Hailey
(74) *Attorney, Agent, or Firm* — Meunier Carlin & Curfman LLC

(57) ABSTRACT

This disclosure describes a coating composition comprising: $Mn_xO_y$, $MnCr_2O_4$, or combinations thereof in a first region of a coating having a first thickness, wherein x and y are integers between 1 and 7; and $X_6W_6(Si_z, C_{1-z})$ in a second region of the coating having a second thickness, wherein X is Ni or a mixture of Ni and one or more transition metals and z ranges from 0 to 1.

20 Claims, 28 Drawing Sheets

(51) Int. Cl.

| | | |
|---|---|---|
| *B01J 23/02* | (2006.01) | |
| *B01J 23/06* | (2006.01) | |
| *B01J 23/26* | (2006.01) | |
| *B22F 1/00* | (2006.01) | |
| *B22F 1/02* | (2006.01) | |
| *C22C 29/02* | (2006.01) | |
| *C25D 5/10* | (2006.01) | |
| *B01J 27/224* | (2006.01) | |
| *B01J 23/889* | (2006.01) | |
| *B01J 37/02* | (2006.01) | |
| *B01J 35/00* | (2006.01) | |
| *B01J 27/22* | (2006.01) | |
| *B01J 23/30* | (2006.01) | |
| *B01J 23/34* | (2006.01) | |

(52) U.S. Cl.
CPC ......... *B01J 35/002* (2013.01); *B01J 35/0006* (2013.01); *B01J 37/0244* (2013.01); *B01J 23/30* (2013.01); *B01J 23/34* (2013.01); *Y10T 428/12486* (2015.01); *Y10T 428/12771* (2015.01); *Y10T 428/12778* (2015.01)

(56) References Cited

U.S. PATENT DOCUMENTS

| | | |
|---|---|---|
| 4,404,487 A | 9/1983 | Nimura |
| 4,613,372 A | 9/1986 | Porter |
| 4,863,892 A | 9/1989 | Porter et al. |
| 5,015,358 A | 5/1991 | Reed et al. |
| 5,242,665 A | 9/1993 | Maeda et al. |
| 5,446,229 A | 8/1995 | Taylor et al. |
| 5,565,087 A | 10/1996 | Brown et al. |
| 5,616,236 A | 4/1997 | Brown et al. |
| 5,630,887 A | 5/1997 | Benum et al. |
| 5,873,951 A | 2/1999 | Wynns et al. |
| 5,910,608 A | 6/1999 | Tenten et al. |
| 5,944,981 A | 8/1999 | Sievert |
| 6,436,202 B1 | 8/2002 | Benum et al. |
| 6,503,347 B1 | 1/2003 | Wysiekierski et al. |
| 6,514,563 B1 | 2/2003 | Kang et al. |
| 6,824,883 B1 | 11/2004 | Benum et al. |
| 6,852,361 B2 | 2/2005 | Kang et al. |
| 6,899,966 B2 | 5/2005 | Benum et al. |
| 7,488,392 B2 | 2/2009 | Benum et al. |
| 8,906,822 B2 * | 12/2014 | Petrone ............ B01J 23/8892 419/19 |
| 2002/0192494 A1 | 12/2002 | Tzatzov et al. |
| 2004/0265604 A1 | 12/2004 | Benum et al. |

FOREIGN PATENT DOCUMENTS

| | | |
|---|---|---|
| CN | 102046846 | 9/2013 |
| WO | 0069047 | 11/2000 |
| WO | 0194664 A2 | 12/2001 |
| WO | 0222905 A2 | 3/2002 |
| WO | 2009152134 | 12/2009 |
| WO | 2013181606 A1 | 12/2013 |

OTHER PUBLICATIONS

Parent U.S. Appl. No. 13/906,865, filed May 31, 2013.
H.F. Bittner et al.: "Analysis of Oxide Coatings on Steam-Oxidized Incoloy 800," Metallurgical Transactions A, vol. 11A, May 1980, pp. 783-790.
J.T. Bell et al.: "Tritium Permeation Through Clean Incoloy 800 and Sanicro 31 Alloys and Through Steam Oxidized Incoloy 800," Metallurgical Transactions A, vol. 11A, May 1980, pp. 775-782.
Office Action issued Dec. 10, 2015 in corresponding Chinese Patent Application 201380040834.9.
Extended European Search Report issued Mar. 3, 2016 in application EP 13797756.7.
Ottewell, S. "New Catalysts Emerge." Chemical Processing, Nov. 2011. Retrieved from Internet at http://www.chemicalprocessing.com/articles/2011/new-catalysts-emerge/?show=all. Retrieved on Feb. 22, 2016.
Wunsch, J.R. "BASF Venture Capital's perspective on Nanotechnology." 4th National Conference of the Nanotechnologies in the Chemical Industry, Milan, Dec. 2010.

* cited by examiner

| Reaction Temperature: 825°C<br>Residence time: ~ 1.8 sec<br>Steam:Ethane= 1:3 | 25Cr-35Ni-Fe Alloy | Modified<br>35Cr-45Ni-Fe Alloy |
|---|---|---|
| | Component wt%<br>Average | Component wt%<br>Average |
| H₂ | 5.79% | 5.93% |
| CO₂ | 0.00% | 0.00% |
| CO | 1.44% | 1.43% |
| Methane | 8.47% | 8.81% |
| Ethane | 15.78% | 15.19% |
| Ethylene | 58.61% | 58.53% |
| Propane | 0.06% | 0.05% |
| Propylene | 1.01% | 1.00% |
| Acetylene | 0.89% | 0.90% |
| iso-Butane | 0.02% | 0.02% |
| n-Butane | 0.06% | 0.05% |
| Other C4 (GP) | 0.23% | 0.22% |
| C5 (GP) | 0.19% | 0.14% |
| 1, 3-Butadiene (NC) | 2.28% | 2.30% |
| n-Hexane | 0.00% | 0.04% |
| Other C6 (GP) | 1.02% | 1.01% |
| Benzene | 3.26% | 3.48% |
| Toluene | 0.33% | 0.34% |
| C7&C7+ (GP) | 0.43% | 0.45% |
| Coke | 0.13% | 0.08% |
| Total | 100.00% | 100.00% |
| Ethane Conversion % | 84.22% | 84.81% |
| Ethylene Yield % | 69.59% | 69.02% |

Fig. 17(a)

| Reaction Temperature: 825°C<br><br>Residence time: ~ 1.8 sec<br>Steam:Ethane= 1:3 | Mn-based catalyst surfaces | Combined Mn-based and W-based catalyst surface |
|---|---|---|
| | Component wt%<br><br>Average | Component wt%<br><br>Average |
| $H_2$ | 6.24% | 8.66% |
| $CO_2$ | 0.20% | 0.50% |
| CO | 1.39% | 1.04% |
| Methane | 8.35% | 8.29% |
| Ethane | 15.32% | 18.16% |
| Ethylene | 58.79% | 56.86% |
| Propane | 0.05% | 0.05% |
| Propylene | 0.95% | 0.51% |
| Acetylene | 0.94% | 0.69% |
| iso-Butane | 0.02% | 0.01% |
| n-Butane | 0.05% | 0.07% |
| Other C4 (GP) | 0.22% | 0.21% |
| C5 (GP) | 0.18% | 0.14% |
| 1, 3-Butadiene (NC) | 2.26% | 1.75% |
| n-Hexane | 0.00% | 0.00% |
| Other C6 (GP) | 0.96% | 0.40% |
| Benzene | 3.24% | 2.20% |
| Toluene | 0.32% | 0.19% |
| C7&C7+ (GP) | 0.44% | 0.24% |
| Coke | 0.06% | 0.04% |
| Total | 100.00% | 100.00% |
| Ethane Conversion % | 84.68% | 81.84% |
| Ethylene Yield % | 69.43% | 69.48% |

Fig. 17(b)

| Steam Cracking | Heavy Liquid Feedstock Blend | 800H (Machined Finish) | 25Cr-35Ni-Fe Alloy (Machined Finish) | KHR45A Alloy (Machined Finish) | Modified 35Cr-45Ni-Fe Alloy (Oxidized Surface) |
|---|---|---|---|---|---|
| Reaction Temperature: 800°C Residence time: ~ 1.8 sec | Component wt% | Component wt% | Component wt% | Component wt% | Component wt% |
| Steam:Feedstock 1:2 (wt) | Average | Average | Average | Average | Average |
| $H_2$ | | 1.31% | 1.36% | 1.26% | 1.45% |
| $CO_2$ | | 0.13% | 0.08% | 0.06% | 0.11% |
| CO | | 0.95% | 0.12% | 0.14% | 0.49% |
| Methane | | 23.87% | 24.11% | 23.63% | 24.26% |
| Ethane | | 4.22% | 4.31% | 4.13% | 4.12% |
| Ethylene | | 39.66% | 39.98% | 39.11% | 39.76% |
| Propane | | 0.27% | 0.27% | 0.26% | 0.25% |
| Propylene | | 9.23% | 9.24% | 9.20% | 8.83% |
| Acetylene | | 0.79% | 0.83% | 0.82% | 0.82% |
| iso-Butane | | 0.20% | 0.20% | 0.20% | 0.19% |
| n-Butane | | 0.02% | 0.02% | 0.03% | 0.02% |
| Other C4 (GP) | | 2.02% | 1.84% | 2.17% | 2.15% |
| 2-Methylbutane | 21.79% | 0.39% | 0.41% | 0.39% | 0.38% |
| n-Pentane | 33.61% | 0.47% | 0.37% | 0.57% | 0.66% |
| 1, 3-Butadiene (NC) | | 3.53% | 3.52% | 3.46% | 3.39% |
| Other C5 (GP) | | 0.27% | 0.31% | 0.33% | 0.35% |
| Cyclo-hexane | 5.22% | 0.05% | 0.00% | 0.00% | 0.01% |
| 3-Methylpentane | 15.51% | 0.05% | 0.04% | 0.07% | 0.14% |
| n-Hexane | 11.55% | 1.08% | 1.45% | 1.15% | 1.51% |
| Other C6 (GP) | | 0.62% | 0.38% | 0.65% | 0.38% |
| 2,3-Dimethylpentane | 5.67% | 0.08% | 0.05% | 0.05% | 0.05% |
| n-Heptane | 4.46% | 0.04% | 0.14% | 0.12% | 0.14% |
| Benzene | | 6.86% | 7.07% | 7.19% | 7.07% |
| Toluene | 2.11% | 2.28% | 2.34% | 2.39% | 2.16% |
| C7&C7+ (GP) | | 1.53% | 1.51% | 2.56% | 1.19% |
| Coke | | 0.06% | 0.06% | 0.06% | 0.12% |
| Total | 100.00% | 100.00% | 100.00% | 100.00% | 100.00% |

Fig. 18(a)

| Steam Cracking | Heavy Liquid Feedstock Blend | Mn-based catalyst surfaces | Combined Mn-based and W-based catalyst surface |
|---|---|---|---|
| Reaction Temperature: 800°C Residence time: ~ 1.8 sec Steam:Feedstock 1:2 (wt) | Component wt% | Component wt% | Component wt% |
| | Average | Average | Average |
| $H_2$ | | 1.53% | 1.53% |
| $CO_2$ | | 0.38% | 0.33% |
| CO | | 2.32% | 1.41% |
| Methane | | 24.54% | 23.95% |
| Ethane | | 4.38% | 4.11% |
| Ethylene | | 39.15% | 39.54% |
| Propane | | 0.25% | 0.25% |
| Propylene | | 8.34% | 8.77% |
| Acetylene | | 0.79% | 0.83% |
| iso-Butane | | 0.19% | 0.20% |
| n-Butane | | 0.02% | 0.02% |
| Other C4 (GP) | | 1.44% | 1.52% |
| 2-Methylbutane | 21.79% | 0.36% | 0.40% |
| n-Pentane | 33.61% | 0.21% | 0.22% |
| 1, 3-Butadiene (NC) | | 3.18% | 3.41% |
| Other C5 (GP) | | 0.21% | 0.20% |
| Cyclo-hexane | 5.22% | 0.00% | 0.00% |
| 3-Methylpentane | 15.51% | 0.00% | 0.00% |
| n-Hexane | 11.55% | 1.07% | 1.17% |
| Other C6 (GP) | | 0.53% | 0.52% |
| 2,3-Dimethylpentane | 5.67% | 0.04% | 0.04% |
| n-Heptane | 4.46% | 0.11% | 0.16% |
| Benzene | | 6.98% | 7.25% |
| Toluene | 2.11% | 2.26% | 2.30% |
| C7&C7+ (GP) | | 1.67% | 1.79% |
| Coke | | 0.08% | 0.08% |
| Total | 100.00% | 100.00% | 100.00% |

Fig. 18(b)

CATALYTIC SURFACES AND COATINGS FOR THE MANUFACTURE OF PETROCHEMICALS

CROSS-REFERENCE TO RELATED APPLICATION(S)

This application is a continuation application of U.S. patent application Ser. No. 13/906,865 filed May 31, 2013, (now U.S. Pat. No. 8,906,822) which claims priority to U.S. Provisional Patent Application No. 61/654,659, filed on Jun. 1, 2012, both of which are incorporated herein by reference in their entirety.

BACKGROUND

From a materials perspective, the manufacture of olefins by hydrocarbon steam pyrolysis has not changed very much since originally commercialized, except to progressively operate at higher operating temperatures with overall greater cracking severity. Process containment or furnace coils have evolved in alloy composition and properties over the last 60+ years to sustain the higher temperatures and lower feedstock residence times. This has resulted in an increase in unwanted or negative catalytic reactions at the coil surfaces and other carbon-based fouling mechanisms; for example, carbon or coke build-up by surface-catalyzed "filamentous" coke-make. Overall, these fouling mechanisms reduce furnace and plant efficiencies, and significantly increase furnace maintenance costs.

Efforts aimed towards mitigating the problem have made some progress over the last quarter century. These efforts include better alloys and coil surfaces, feedstock additives and inhibitors, and coil coatings. For example, in the 1980s and 1990s, several promising coating technologies were developed and commercialized aimed at rendering the internal surfaces of furnace coils chemically inert to the pyrolysis or cracking process (i.e., shutting-down catalytic or filamentous coke-make). Overall, these coatings were able to provide some improvements in furnace run-lengths from a typical baseline of ~20-40 days. The use of inert coatings increased run lengths by a factor of 2-3 times. The run lengths, however, rarely exceeded ~100 days on-line. The success of some of these coatings prompted some steel producers to develop and commercialize novel alloys away from industry-standard chromia-forming austenitic stainless steels whose surfaces exhibit relatively low temperature stability under cracking conditions (<1050° C. (1922° F.)). The newly developed steels were engineered with higher temperature-stable surfaces through the use of alumina-formers.

Hydrocarbon processing in the manufacture of petrochemicals is carried out in processing equipment that includes tubing, piping, fittings and vessels of broad geometries and alloy compositions. These components are generally made of ferrous-based alloys designed to provide adequate chemical, mechanical and physical properties for process containment, and resistance to a range of materials degradation processes. In commercial applications operating above 500° C., austenitic stainless steels are often used ranging from 300 series alloys through to 35Cr—45Ni—Fe alloys, with the level of nickel and chromium in the alloy generally increasing with operating temperature. Above 800° C., a sub-group of these austenitic steels are used and are collectively known as high-temperature alloys (HTAs) or heat-resistant alloys. These HTA steels range from 25Cr—20Ni—Fe (HK40) through to 35Cr—45Ni—Fe (or higher), plus alloying additives in cast form, and similar compositions in wrought form. In general, stainless steel surfaces are prone to the formation of filamentous (catalytic) carbon or coke and the accumulation of amorphous (or gas-phase) coke, with their relative contribution to the total coke-make being defined by the petrochemical manufacturing process, feedstock, and the operating conditions. Filamentous coke formation is well documented and has been shown to be catalyzed by transition metal surface species, their oxides, and compounds thereof, with iron and nickel-based species being the major catalysts present in stainless steels.

The broad commercial use of stainless steel alloys, especially HTAs is partially due to their ability of generating and re-generating a protective rhombohedral chromia ($Cr_2O_3$) scale for protection. These steels are collectively known as "chromia-formers" with the scale believed to provide both corrosion protection and resistance to filamentous (catalytic) coke formation. It is generally accepted that a bulk alloy level of 13-17 wt % Cr is required to generate and sustain a contiguous and protective chromia scale. The overall protection provided by the chromia is good to excellent within its operating limitations. One critical limitation pertinent to hydrocarbon processing is that under highly carburizing conditions (as for example with a carbon activity $a_c \geq 1$ during steam pyrolysis of aliphatic hydrocarbon feedstock) and temperatures greater than approximately 1050° C. (or lower depending on actual conditions), the chromia is converted to chromium carbides, leading to volume expansion, embrittlement, and subsequent loss of protection. Additionally, under highly oxidizing conditions (as for example, during furnace start-up and decoking), above a critical temperature, the chromia is converted to $CrO_3$ and volatilized. Therefore, there is great commercial value in a base alloy with the mechanical and physical properties of the HTAs currently used, but with a protective coating and surface that overcomes the limitations of the chromia scale and provides greater protective benefits for reducing carbon-based fouling and corrosion.

In the manufacture of major petrochemicals, the generation of a chromia scale on process components such as furnace coils is often critical in achieving and perhaps exceeding furnace design capacity. As an example, in steam pyrolysis of ethane to produce ethylene, the operating sequence is typically 20-90 days online of production, followed by 1-4 days offline for decoking. This industry "optimum" capitalizes on the protection provided by the chromia scale, while operating, as best as is feasible, within the chemical and mechanical limitations that the chromia scale imposes on the process.

Efforts to reduce filamentous (catalytic) coking have involved the use of coatings, pre-oxidation of components, chemical additives, or a combination thereof, all aimed at rendering the surface catalytically-inert to filamentous coke-make. Examples of coated products are based on the teachings of U.S. Pat. No. 5,873,951 and Canadian patent 2,227,396 aimed at generating an alumina layer in contact with the process stream. Canadian patent 2,227,396 also teaches the use of a coating aimed at generating a chromia layer at the outermost surface. U.S. Pat. No. 4,297,150 teaches the use of CVD processes to deposit coatings aimed at providing a silica layer in contact with the process stream. The use of chemical additives in some petrochemical industries is broad. As an example, most commercial operations manufacturing olefins by steam pyrolysis add a sulfur-based compound (such as DMS or DMDS) to the feedstock at levels of a few ppm to several hundred ppm to poison catalytic surface sites. Alternatively, other efforts have tried to passivate the surface through the addition of various proprietary chemical additives to the feedstock (see U.S. Pat. Nos. 4,613,372, 4,804,487, 4,863,892, 5,015,358, 5,565,087, 5,616,236, and 5,446,229). Generally, the level of commercial success achieved through the use of coated products, pre-oxidation, or chemical additives to reduce filamentous (catalytic) coking in light feedstock olefins furnaces has generally been limited to a 2-3 fold improvement in run-length at best, over industry surveyed run-lengths that were presented at the AIChE Ethylene Producers' Conference in 1995. Most recently, NOVA Chemicals (see U.S. Pat. Nos. 5,630,887, 6,436,202, 6,824,883, and 6,899,966) has achieved run-lengths in excess of 400 days (better than a 10-fold improvement in runlength) with a gas treatment technology based on generating a [Cr—Mn]-spinel surface on the steel components, and SK (see U.S. Pat. Nos. 6,514,563 and 6,852,361) has achieved a 3-4 fold improvement with an in-situ coating application technology.

The selection and use of protective surface oxides on stainless steels by the above teachings is illustrated in Table 1 hereinbelow (see Metallurgical and Materials Transactions A Vol. 11 Number 5, May 1980 Tritium permeation through clean incoloy 800 and sanicro 31 alloys and through steam oxidized incoloy 800 Author(s): J. T. Bell; J. D. Redman; H. P. Bittner Pages: 775-782; and Analysis of oxide coatings on steam-oxidized incoloy 800 Author(s): H. F. Bittner; J. T. Bell; J. D. Redman; W. H. Christie; R. E. Eby Pages: 783-790) with efforts aimed at generating surface species more thermodynamically stable than chromia. Commercially-available furnace products used in the manufacture of petrochemicals have focused mainly on providing a chromia, silica, alumina or a [Cr—Mn]-spinel scale in contact with the hydrocarbon process stream.

TABLE 1

Relative Oxide Stability of Austenitic Stainless Steel Components from Free Energies of Formation Data

| Oxide | $-\Delta G° \times 10^{-4}$ (cal/mole $O_2$) at 900 K |
|---|---|
| NiO | 7.45 |
| $Fe_2O_3$ | 9.35 |
| $Fe_3O_4$ | 9.85 |
| FeO | 9.88 |
| $Mn_2O_3$ | 11.58 |
| $Mn_3O_4$ | 12.78 |
| $FeCr_2O_4$ | 13.34 |
| $Cr_2O_3$ | 14.35 |
| $MnCr_2O_4$ | N/A |
| MnO | 15.26 |
| $SiO_2$ | 17.10 |
| $Ti_2O_3$ | 20.19 |
| $Al_2O_3$ | 22.15 |

In summary, the prior art related to materials solutions (coatings, modified base alloy formulations, or pre-oxidation) to the coking, catalytic activity and corrosion problem in petrochemical furnaces teaches that stainless steel alloy technology is based on generating a chromia protective scale, and that recent teachings suggest that similar austenitic HTAs can also be used to generate an alumina, silica or Cr—Mn spinel. Secondly, with the exception of the NOVA Chemicals [Cr—Mn]-spinel technology, the prior art teaches that efforts aimed at generating [Cr—Mn]-spinel based surfaces are of little commercial value due to their low thermo-mechanical stabilities and reduced protection to the base alloy after any damage/delamination. Thirdly, it teaches that commercial coated products are based on the generation of a protective alumina or silica scale with other properties that may be superior to the same scale generated on uncoated alloys. Overall, all of the above teachings are aimed at enhancing the inertness of the surface to the cracking process.

The prior art relating to coatings aimed at enhancing the catalytic gasification properties of the surface teaches that carbon gasification during cracking is possible through the use of coatings but little commercial success has been realized to-date primarily due to such products' inability to address survivability requirements under the extreme conditions present in olefins manufacture.

The disclosure hereinbelow capitalizes on the potential negative impact on the overall cracking process, despite the relatively low surface area exposure to the overall process stream, and provides coatings and surfaces that can eliminate the unwanted (negative) catalytic properties as one benefit, and simultaneously provide positive or beneficial catalytic activity as a major new materials and process benefit to the industry. Such coatings and surfaces can provide significant commercial value ranging from improvements in plant efficiencies and profitability, to reducing energy requirements, steam dilution requirements and overall greenhouse gas emissions.

The disclosure hereinbelow involves the application of functionally-graded coatings that sustain surfaces with positive catalytic activity, and a range of catalyst formulations and surface loading integrated into commercially-viable coating systems using current industry furnace alloys. Two families of surfaces have been developed, providing a significant range of catalytic functionality impacting the process, as well as a coating system aimed at ensuring commercial viability. The coatings are best described as composites, consisting of metallic, intermetallic and ceramic constituents, and exclude expensive constituents such as precious metals. It is recognized that olefins furnaces represent some of the most extreme high temperature and corrosive conditions of any industrial manufacturing and represent serious challenges to commercial-scale viability. Overall, the disclosure herein aims to provide additional chemical, physical and thermo-mechanical properties in its coatings to achieve commercial viability.

SUMMARY

Various embodiments of this disclosure involve the deposition of a Mn and W-based coating matrix on a range of alloy steel components, capable of generating and sustaining up to two groups of catalytic surfaces:

Mn-based Surfaces: $MnO$, $MnO_2$, $Mn_2O_3$, $Mn_3O_4$, $MnCr_2O_4$

W-based Surfaces: $CaWO_4$, $Ba_3Y_2WO_9$

The Mn-based surfaces of described in this disclosure capitalize on the greater thermodynamic stability of the oxides MnO and $MnCr_2O_4$ spinel, relative to chromia, and the ability to control the kinetics of oxidation to set-up oxide growth conditions that results in protective oxide surface systems (protective surfaces) with good chemical and thermo-mechanical stability for commercial utility in severe petrochemical furnace environments. The Mn-based surfaces include:

$MnO$, $MnO_2$, $Mn_3O_4$, $Mn_2O_3$, $MnCr_2O_4$

These surfaces can be generated from the functionally-graded coating system generated as described below and capable of providing under pyrolysis (cracking) conditions, an outermost surface composition in contact with the hydrocarbon process fluid stream that provides catalytic gasification of carbon, high resistance to filamentous (catalytic) coking, and enhanced corrosion protection. This disclosure involves at least four elements to help achieve commercial utility:

- Base material or steel alloy selection
- Coating formulation and application
- Coating consolidation with base alloy by heat treatment
- Surface generation and catalytic activation According to one embodiment, a coating composition is disclosed. The coating composition comprises: $Mn_xO_y$, $MnCr_2O_4$, or combinations thereof in a first region of a coating having a first thickness, wherein x and y are integers between 1 and 7; and $X_6W_6(Si_z, C_{1-z})$ in a second region of the coating having a second thickness, wherein X is Ni or a mixture of Ni and one or more transition metals and z ranges from 0 to 1.

According to another embodiment, a coating is disclosed. The coating comprises: a first region having a first thickness, wherein the first region comprises $Mn_xO_y$, $MnCr_2O_4$, or combinations thereof, wherein x and y are integers between 1 and 7; and a second region having a second thickness, wherein the second region comprises $X_6W_6(Si_z, C_{1-z})$, wherein X is Ni or a mixture of Ni and one or more transition metals and z ranges from 0 to 1.

According to another embodiment, a substrate coated with the above-described coating is disclosed. The substrate can be made from austenitic steel, a nickel based alloy, an iron based alloy, and/or a nickel-iron based alloy. The substrate can be a cracking coil, quench exchanger, or other downstream equipment used for olefin production or steam pyrolysis.

BRIEF DESCRIPTION OF THE DRAWINGS

FIG. 14(a) shows Mn-based candidate catalyst XRD before and after S exposure; FIG. 14(b) shows W-based candidate catalyst XRD before and after S exposure; FIG. 14(c) shows Mn-based candidate catalyst TGA gasification efficacy before and after S exposure; FIG. 14(d) shows W-based candidate catalyst TGA gasification efficacy before and after S exposure.

FIG. 17(a) and FIG. 17(b) show tables that summarize laboratory steam pyrolysis results using ethane feedstock over select reference materials, and the Mn-based catalyst species and W-based catalyst species of this disclosure.

FIG. 18(a) and FIG. 18(b) show tables that summarize laboratory steam pyrolysis results using a Heavy blend feedstock: FIG. 18(a) Reference run and FIG. 18(b) run with use of Mn-based catalyst surface and run with using a combined Mn-based catalyst surface (high surface coverage) and a W-based catalyst surface (low surface coverage).

FIG. 20(a) run with reference materials; and FIG. 20(b) run with use of Mn-based catalyst surface (high surface coverage) and run with using a combined Mn-based catalyst surface (high surface coverage) and a W-based catalyst surface (low surface coverage).

DETAILED DESCRIPTION

Olefin production through stream cracking is highly energy and capital intensive. One detrimental consequence of the cracking process is the formation of coke. Coke deposits in cracking coils, quench exchangers, and other downstream equipment which results in: loss of heat transfer and thermal efficiency, carburization of coils and components, high maintenance costs and reduced furnace availability, high pressure drop and reduction in furnace throughput, and reduced production yield. Embodiments of the disclosure include coatings and coating methods that catalyze carbon gasification reactions, thereby reducing the build up of coke in cracking coils, quench exchangers and other downstream equipment.

Figure 1A:
FIG. 1a is a scanning electron micrograph (hereinafter "SEM") of early stage growth of a coke deposit.
Figure 1B:
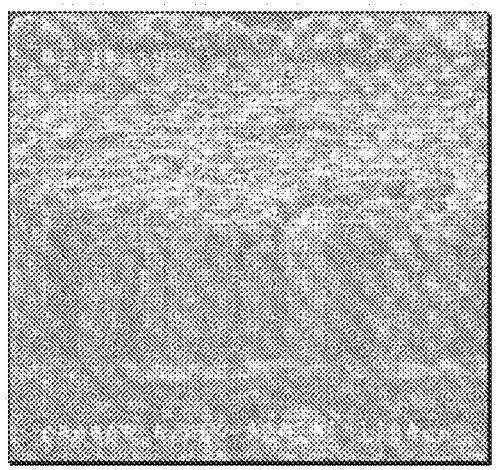
FIG. 1b is a SEM of late stage growth of a coke deposit.

FIGS. 1a and 1b illustrate the catalytic formation of coke in a conventional uncoated cracking coil. Nickel and iron in the bulk tube metal (typically austenitic steel) act as catalysts for coke formation. FIG. 1a illustrates early stage coke formation. In this stage, coke grows as hair-like filaments with an active nickel or iron particle at the tip. In the later stages of growth, illustrated in FIG. 1b, the filaments grow laterally into each other and continue to lengthen. The result is a thick porous carbon coating.

In an embodiment (shown in FIG. 2), the catalytic coating 100 has two distinct regions. A first (top) region 102 is the outermost region of the catalytic coating 100. This region is exposed to the atmosphere. Underlying the first region 102 is a second region 104. The second region 104 is immediately adjacent the substrate 106. The substrate 106 may be, for example, a cracking coil, quench exchanger, or other downstream equipment used for olefin production or steam pyrolysis. The catalytic coating 100 may additionally be used to protect pipe and equipment for other, non-olefin production processes in which coke formation is undesirable. The substrate 106 may be, for example, an austenitic steel, a nickel based alloy, an iron based alloy, or a nickel-iron based alloy.

The first region 102 may have a thickness of 0.5-20 microns in one embodiment. In another embodiment, the first region 102 may have a thickness of 1-10 microns. In an embodiment, the first region may comprise manganese oxides or chromium-manganese oxides or combinations of one or more manganese oxides and/or chromium-manganese oxides. Manganese oxides have the general formula $Mn_xO_y$, where x and y are integers. Example manganese oxides include MnO, $Mn_2O_3$, $Mn_3O_4$, and $MnO_2$. Chromium-manganese oxides include but are not limited to $MnCr_2O_4$.

In an embodiment, the second region 104 may have a thickness of 100-1000 microns. In another embodiment, the second region 104 may have a thickness of 200-500 microns. The second region 104 typically includes two or more phases 108, 110. In one embodiment, the first phase 108 ("white" in FIG. 2) has a stoichiometry of $X_6W_6(Si_z, C_{1-z})$ "661", where X comprises Ni or a mixture of Ni and one or more transition metals and z ranges from 0 to 1. The transition metal may be, for example, Fe, Nb, Cr, Mn, Ti, and/or combinations of these metals. In another embodiment, the first phase 108 has a stoichiometry of $XW(Si_z, C_{1-z})$ "111." Alternatively, the first phase 108 may be a mixture of "661" and "111." The second phase 110 (dark in FIG. 2) may be designated as the matrix.

In an embodiment, the overall composition of the second region 106 includes, Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %. The composition of the second phase (matrix) 110 may be ascertained by determining the amount and composition of the first phase 108 and subtracting from the overall composition of the second region 106. The first phase 108 may comprises 40-80% of the second region 104.

In another embodiment, the first region 102 of the catalytic coating 100 may include a calcium-tungsten oxide ($CaWO_4$), or a barium-yttrium-tungsten oxide ($Ba_3Y_2WO_9$), or combinations of a calcium-tungsten oxide and a barium-tungsten-yttrium oxides in addition to the manganese oxides and/or chromium-manganese oxide. In an embodiment, the $CaWO_4$ and/or $Ba_3Y_2WO_9$ may comprise 1-40% of the first region. The catalytic gasification of this embodiment may exceed the catalytic gasification of an embodiment without $CaWO_4$ and/or $Ba_3Y_2WO_9$.

Figure 3:
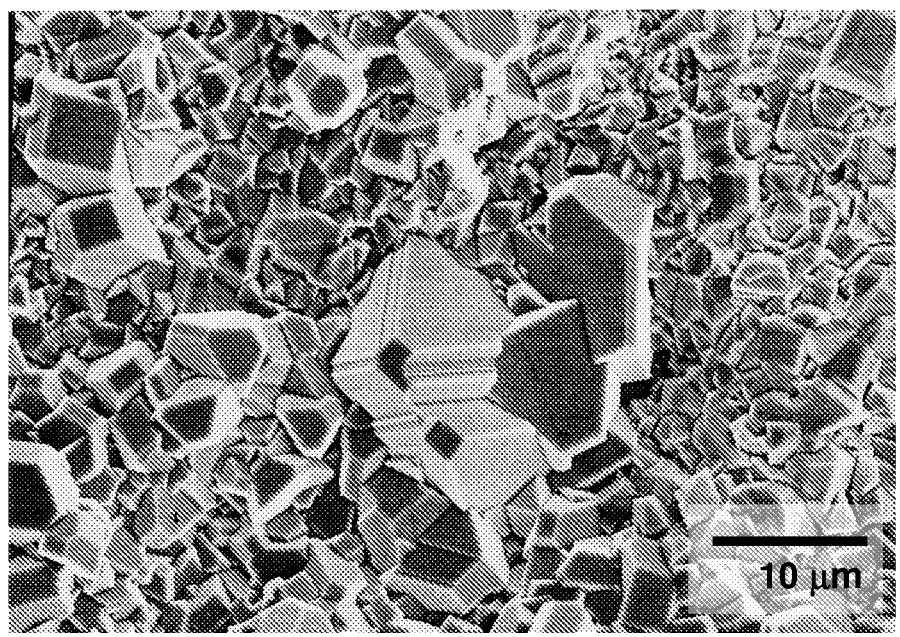
FIG. 3 is a SEM of a top view of the low catalytic gasifier (hereinafter "LCG") surface comprising Mn-based coating with W.

The SEM in FIG. 3 illustrates the top view of the LCG surface comprising Mn-based coating with W. The oxide shown represents a small, closely packed crystal structure which is highly desirable from a thermo-mechanical property perspective due to its high stability in the desired application.

Figure 4:
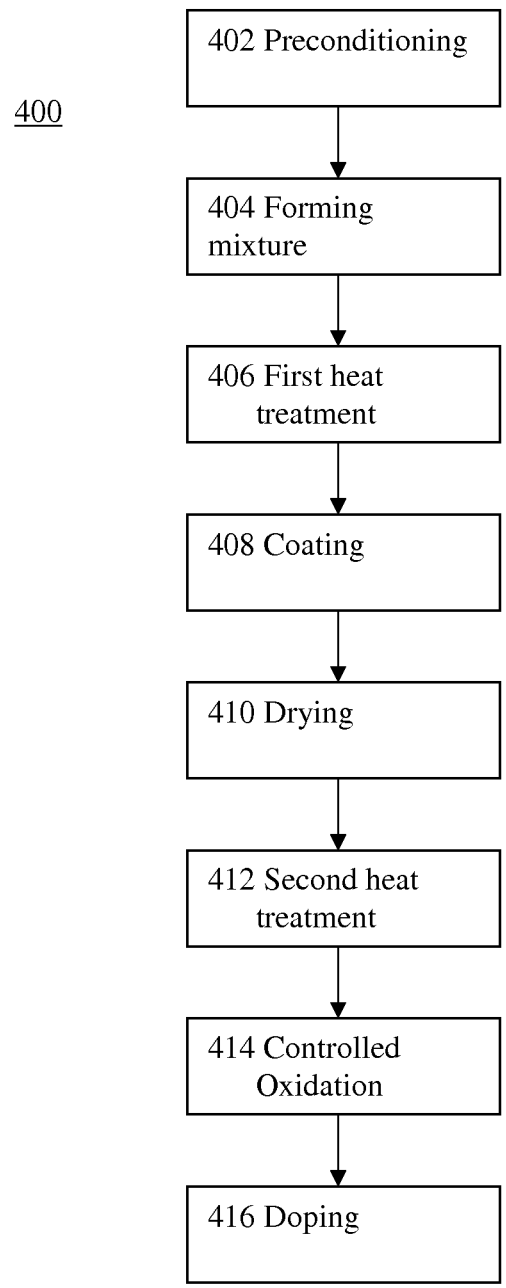
FIG. 4 is a flow diagram of a method according to an embodiment.

Another embodiment relates to methods of coating 400 an object with a catalytic coating (see FIG. 4). In one aspect, the method includes a step of forming a mixture of metal powders 404. The mixture of metal powders may include Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %. The powders may be in elemental form and processed (e.g., screened) to have a size distribution having d50 of <10 microns. In another aspect, the size distribution has a d50 preferably <7 microns. In another aspect, the size distribution has a d50 preferably <5 microns.

In one aspect, the powders are pre-conditioned to make them reactive 402. To make the powders reactive, the powders may be exposed to a reducing agent to remove oxide on the surface of the powders. Reduction of the oxide may be performed by exposing the powders to heated hydrogen, electrochemically or by any other method known in the art. In some embodiments, all of the powder is made reactive. In other embodiments, only a portion of each of the powders is made reactive. In some embodiments, the portion of each powder that is made reactive may be, for example 50%, 25%, 10%, 5%, 2% by weight. That is, the portion of each powder that may be made reactive may be between 0-50% by weight. The individual powders may be pre-conditioned prior to mixing. Alternatively, some or all of the powders may be mixed and then subject to a pre-conditioning treatment.

The method also includes a step of conducting a first heat treatment at a first temperature after the mixing the powders. The first heat treatment 406 is preferably conducted at a temperature above 250° C. Alternatively, the first heat treatment 406 may be conducted at a temperature above 350° C. In another embodiment, the first heat treatment 406 may be conducted at a temperature above 400° C. The time for the first heat treatment 406 will vary with temperature; the hotter the heat treatment temperature, the less time is used for treatment. The first heat treatment 406 is preferably conducted in a vacuum or an inert atmosphere. The inert atmosphere may be, for example, argon, neon, helium, or combinations of these gases. The first heat treatment 406 partially stabilizes the powder mixture.

In the next step, the partially stabilized powder mixture is applied to the object to be coated 408. Application of the partially stabilized powder mixture 408 may be performed, for example, by spray coating, dip coating, or any other coating method. Depending on the application process selected, the partially stabilized powder may be liquid form, a spray form, or a quasi-solid form.

After the object is coated 408 with the partially stabilized powder mixture, the object is optionally allowed to dry 410. Next, a second heat treatment is performed 412. The second heat treatment 412 consolidates the coating. In the consolidation process, the powder mixture interdiffuses into a defined microstructure. The second heat treatment 412 is preferably conducted in a vacuum and/or in an inert atmosphere. The inert atmosphere may be, for example, argon, neon, helium, or combinations of these gases. The concentration of reactive gases such as oxygen and nitrogen should be kept low. In one aspect, a vacuum is first drawn and then 1-2 torr of argon is introduced to the vacuum chamber.

After the second consolidation heat treatment 412, a controlled oxidation is performed 414. In the controlled oxidation 414, the coating is heated in the presence of oxygen. Depending on the oxygen concentration, the temperature and the time of the controlled oxidation, different oxide compositions, crystal structures and morphologies can be produced.

In an alternative embodiment, the method includes a step of doping 416 the first regions 102 of the coating 100 with $CaWO_4$ and/or $Ba_3Y_2WO_9$. Doping 406 may be performed, for example, by introducing a sol containing, for example, CaO and $WO_3$ while the oxide grows. Doping is typically performed at elevated temperatures but below 800° C. In an embodiment, the sols can be introduced into a gas stream as the oxide grows. Other methods of doping the first regions 102 of the coating 100 with $CaWO_4$ and/or $Ba_3Y_2WO_9$ may also be used.

Figure 2:
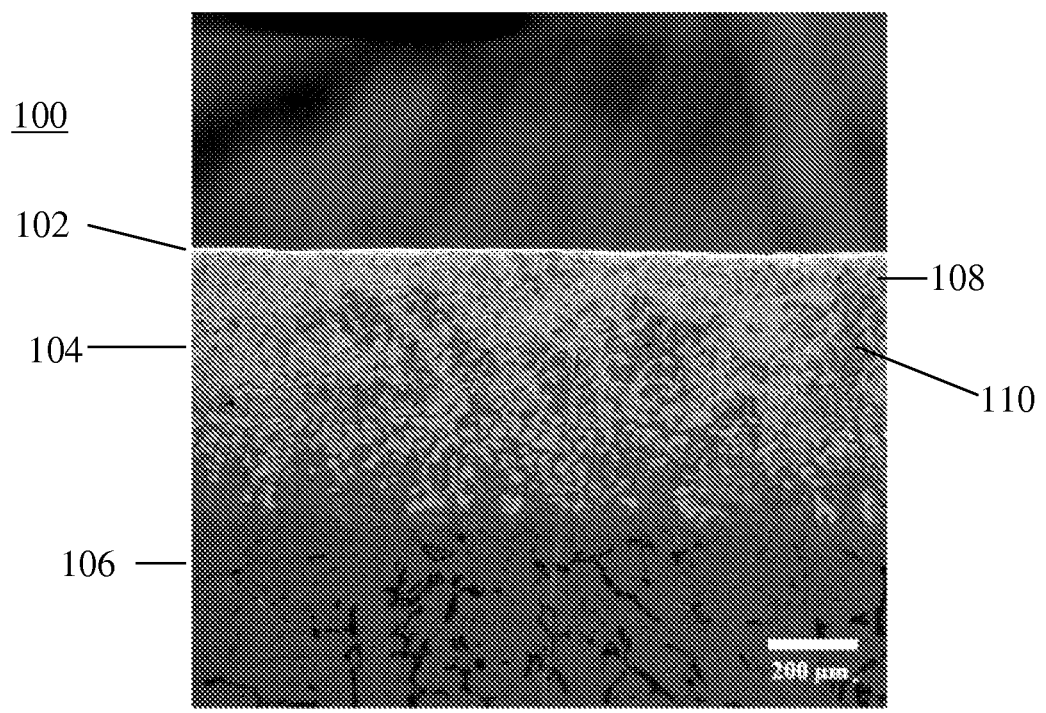
FIG. 2 is a SEM of a cross section of a catalytic coating according to an embodiment.

Another embodiment relates to an object 106 having a catalytic coating 100 (FIG. 2). In one aspect, the catalytic coating 100 includes a first region 102 having a first thickness and comprising $Mn_xO_y$, $MnCr_2O_4$, or combinations of these oxides, where x and y are integers and a second region 104 having a second thickness and comprising a first phase 108 and a second phase 110. The first phase 108 includes $X_6W_6(Si_z, C_{1-z})$, where X is Ni or a mixture of Ni and one or more transition metals while z ranges from 0 to 1. The second region 104 generally has an overall composition including Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %.

The thickness of the first region 102 may be 0.5-20 microns. In another embodiment, the first region 102 may have a thickness of 1-10 microns. In an embodiment, the second region 104 may have a thickness of 100-1000 microns. In another embodiment, the second region 104 may have a thickness of 200-500 microns. The second region 104 typically includes two or more phases 108, 110. In one embodiment, the first phase 108 has a stoichiometry of $X_6W_6(Si_z, C_{1-z})$ "661", where X comprises Ni or a mixture of Ni and one or more transition metals and z ranges from 0 to 1. The transition metal may be, for example, Fe, Nb, Cr, Mn, Ti, and/or combinations of these metals. In another embodiment, the first phase 108 has a stoichiometry of $XW(Si_z, C_{1-z})$ "111." Alternatively, the first phase 108 may be a mixture of "661" and "111." The second phase 110 may be designated as the matrix.

In an embodiment, $Mn_xO_y$ may include MnO, $Mn_2O_3$, $Mn_3O_4$, and $MnO_2$. Additionally, the first phase 108 may comprise 40-80% of the second region 104.

In an alternative embodiment, the first region 102 of the coating 100 further includes $CaWO_4$, $Ba_3Y_2WO_9$, or combinations of these oxides. In one aspect, the $CaWO_4$, $Ba_3Y_2WO_9$, or combinations may comprises 1-40% of the first region 102.

Coatings that are functionally-graded in depth have been developed for metal alloy components susceptible to carbon-based fouling (coking), corrosion and erosion in hydrocarbon processing at elevated temperatures. The coatings generate and sustain surfaces that catalytically gasify carbonaceous matter, are inert to filamentous-coke formation, and overall provide a net positive economic impact to hydrocarbon manufacturing processes. Additionally, the coatings provide protection to the base alloy from various forms of materials degradation inclusive of high temperature oxidation, carburization, and erosion. The coatings are functionally-graded to achieve both the outermost surface catalytic properties required, and a broad range of chemical, physical and thermo-mechanical properties needed to survive the severe operating conditions of hydrocarbon processing, specifically, petrochemicals manufacture that can exceed 800° C.

Commercial applications of such coatings include furnace components used to manufacture major petrochemicals such as olefins by hydrocarbon steam pyrolysis in which temperatures may exceed 1100° C. These coatings and surfaces have been demonstrated to increase operating efficiency by gasification of carbonaceous deposits, reducing filamentous coke formation, and positively impacting the overall pyrolysis process and product stream. As an example, in the pyrolysis of aliphatic feedstocks to produce mainly ethylene, the low-coking environment provided by this disclosure can reduce carbon-based fouling to temperatures of 1100° C. depending on cracking severity and feedstock, with a neutral or positive impact on product yields. The benefits of the disclosure can be utilized commercially by providing a significant range of new operating regimes as described in Table 2.

TABLE 2

| Potential Benefits | Lighter (Ethane/Propane) Hydrocarbon Feedstocks | | Heavier (Butane/Naphtha) Hydrocarbon Feedstocks | |
| --- | --- | --- | --- | --- |
| | Current Commercial Range | Potential Range of Use | Current Commercial Range | Potential Range of Use |
| Operating Run Length | 10-90 days | 20 to 500+ days | 10-90 days | 20-200+ days |
| Feedstock Conversion | 50 to 75% | 60 to 90+% | 60-85% | 60-90+% |
| Steam Dilution (as kg steam:kg hydrocarbon) | 0.28 to 0.33 | 0.18 to 0.33 | 0.40 to 0.60 | 0.30 to 0.60 |
| Operating Tube Metal Temperature (TMT) | 1000-1150° C. | 10 to 50° C. lower in average TMT | 950-1150° C. | 10 to 50° C. lower in average TMT |

The selection of a base alloy composition compatible with the operating environment and also compatible with coating formulation for generating targeted microstructures is considered. Ideally the base alloy is an austenitic stainless steel with at least 8 wt % Ni, preferably greater than 20 wt % Ni and most preferably greater than 40 wt % Ni. The balance of other elements in the austenitic steel is defined by operating conditions requirements, and the coating formulation can be adjusted to compensate for commercial ranges of Fe, Cr, and microalloying levels.

Coating formulation and application is possible by a range of coating technologies such that material of the compositional range in the table below is delivered to the surface in a uniform manner with a final thickness after consolidation of a minimum of 10 microns and a maximum of 5,000 microns. The coating constituents need to be delivered in a state of high reactivity to allow subsequent interdiffusion and alloying with the base alloy steel components during controlled-atmosphere heat treatment consolidation. Coating formulation is tailored to the base alloy composition and the targeted surface properties. Typical ranges for the key constituents in the coating after consolidation are as follows in Table 3:

TABLE 3

| Coating Constituents | Range | Average |
|---|---|---|
| Chromium | 10-30 wt % | 20 wt % * |
| Iron | 1-20 wt % | 10 wt % * |
| Nickel | 10-50 wt % | 25 wt % * |
| Tungsten | 5-60 wt % | <30 wt % |
| Manganese | 2-30 wt % | <15 wt % |
| Silicon | 2-15 wt % | <8 wt % |
| Niobium | 0-3 wt % | <2 wt % |
| Molybdenum | 0-3 wt % | <2 wt % |
| Titanium | 0-3 wt % | <2 wt % |
| Aluminum | 0-3 wt % | <2 wt % |

* denotes constituents provided primarily by base alloy

Coating application can be undertaken by a range of techniques capable of delivering powder-based formulations to the surface of the components. These include thermal spray-based processes and slurry-based coating methods. The preferred coating approach of this disclosure is slurry-based methods with additions of aqueous and organic components known to those versed in the art and appropriate to the compositional formulations noted in the table above.

Heat treatment for coating consolidation is undertaken under a controlled inert atmosphere ranging from vacuum level through to elevated pressures. The pressure was found to not be critical, but the reduction of reactive species such as oxygen and nitrogen needs to be controlled. The temperature of consolidation ranges from 900 to 1200° C., depending on the base material or steel alloy composition, coating formulation and the targeted coating microstructure.

Following heat treatment consolidation, the coating is prepared for final surface generation and catalyst activation. Standard cleaning procedures can be used to achieve the desired level of surface cleanliness and surface finish. An initial hydrogen treatment is used to reduce surface oxide species and remove carbonaceous contaminants such as organic cutting fluids.

Stage I: Reduction and Cleaning
Hydrogen species: $H_2$
Carrier gas/diluent none, nitrogen, or argon
Temperature 400 to 1000° C.
Time: 2 to 24 hours
Stage II: Oxidation and Catalytic Activation
Oxygen-bearing species: air, $O_2$, $CO_2$, steam
Carrier gas/diluent: none, nitrogen, or argon
Temperature: 800 to 1100° C.
time: 4 hours to 100 hours

EXAMPLES

Figure 5:
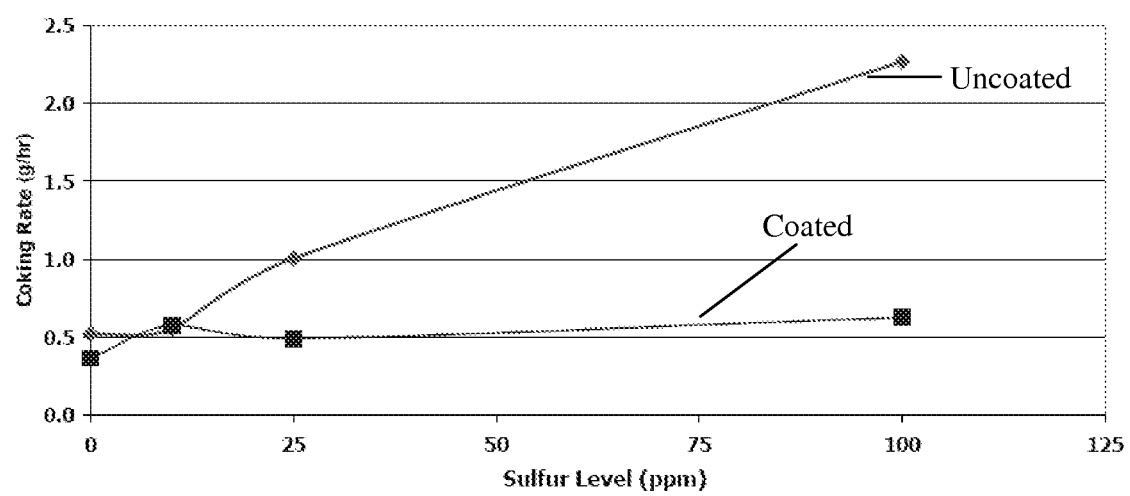
FIG. 5 is a plot comparing the overall coking-rate within a pilot pyrolysis test circuit as a function of sulfur level for ethane cracking, 65% conversion, 0.3:1 steam:hydrocarbon ratio of an embodiment with an uncoated 35C5-45Ni—Fe alloy.

FIG. 5 is a plot comparing the overall coking-rate within a pilot pyrolysis test circuit as a function of sulfur level for ethane cracking, 65% conversion, 0.3:1 steam:hydrocarbon ratio of an embodiment with an uncoated 35Cr—45Ni—Fe alloy. As can be seen in FIG. 5, an increase in the sulfur content of the ethane in an uncoated reactor results in a significant increase in the coking rate. Sulfur levels as low as 100 ppm result in an almost five fold increase in the rate of coke formation absent sulfur. With the use of a coating according to an embodiment having manganese oxides and chromium-manganese oxides, however, the rate of coke formation remains essentially constant.

Figure 6:
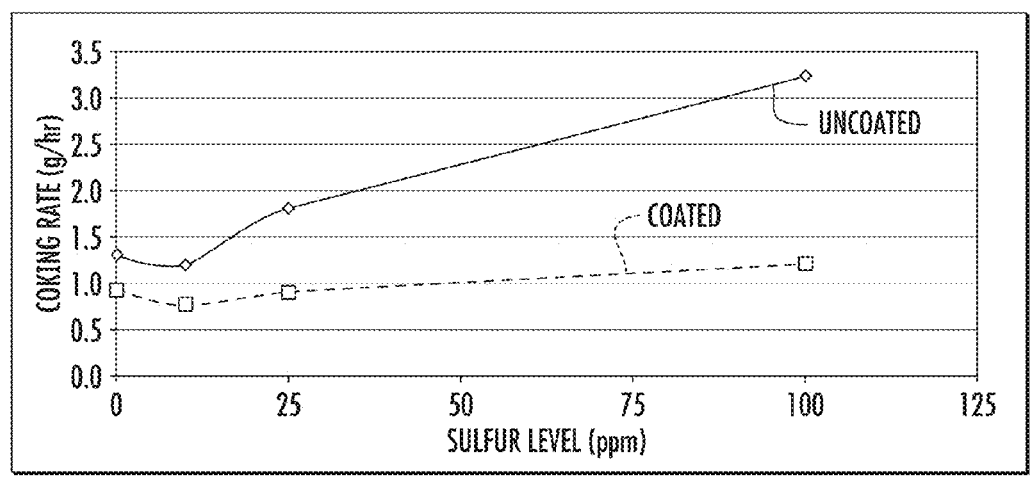
FIG. 6 is a plot comparing the overall coking-rate within a pilot pyrolysis test circuit as a function of sulfur level for butane cracking, 95% conversion, 0.4:1 steam:hydrocarbon ratio of an embodiment with an uncoated 35C5-45Ni—Fe alloy.

FIG. 6 is a plot comparing the overall coking-rate within a pilot pyrolysis test circuit as a function of sulfur level for butane cracking, 95% conversion, 0.4:1 steam:hydrocarbon ratio of an embodiment with an uncoated 35Cr—45Ni—Fe alloy. The results for butane cracking are similar to the results for ethane cracking illustrated in FIG. 5. That is, use of a coating according to an embodiment having manganese oxides and chromium-manganese oxides, results in a coking rate that is insensitive to the sulfur content of the butane while an uncoated reactor suffers a significant increase in the coking rate as a function of sulfur content.

Figure 7:
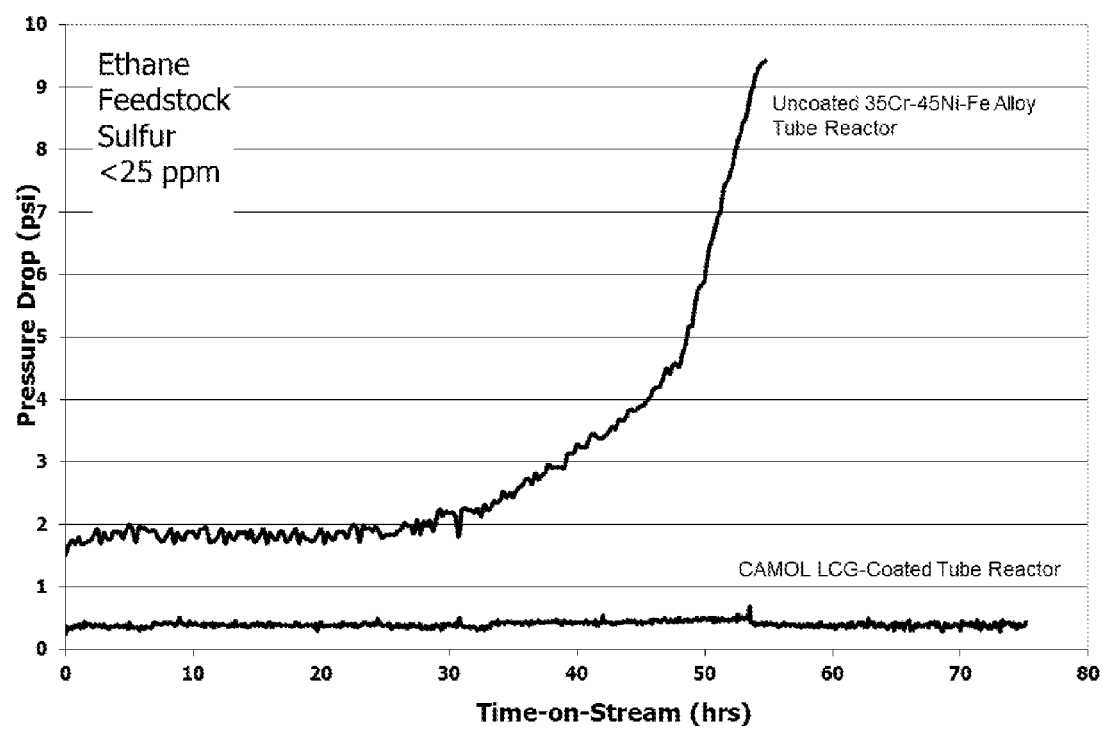
FIG. 7 is a plot comparing the pressure drop of an embodiment with an uncoated 35C5-45Ni—Fe alloy.

FIG. 7 is a plot comparing the pressure drop of an embodiment with an uncoated 35Cr—45Ni—Fe alloy. In this embodiment the first region 102 of the coating 100 includes manganese oxides and chromium-manganese oxides. After 30 hours, the uncoated pipe begins to suffer an increasing pressure drop while the pressure in the coated pipe remains constant. The pressure drop is an indication of a growing coke layer in the uncoated pipe.

Figure 8:
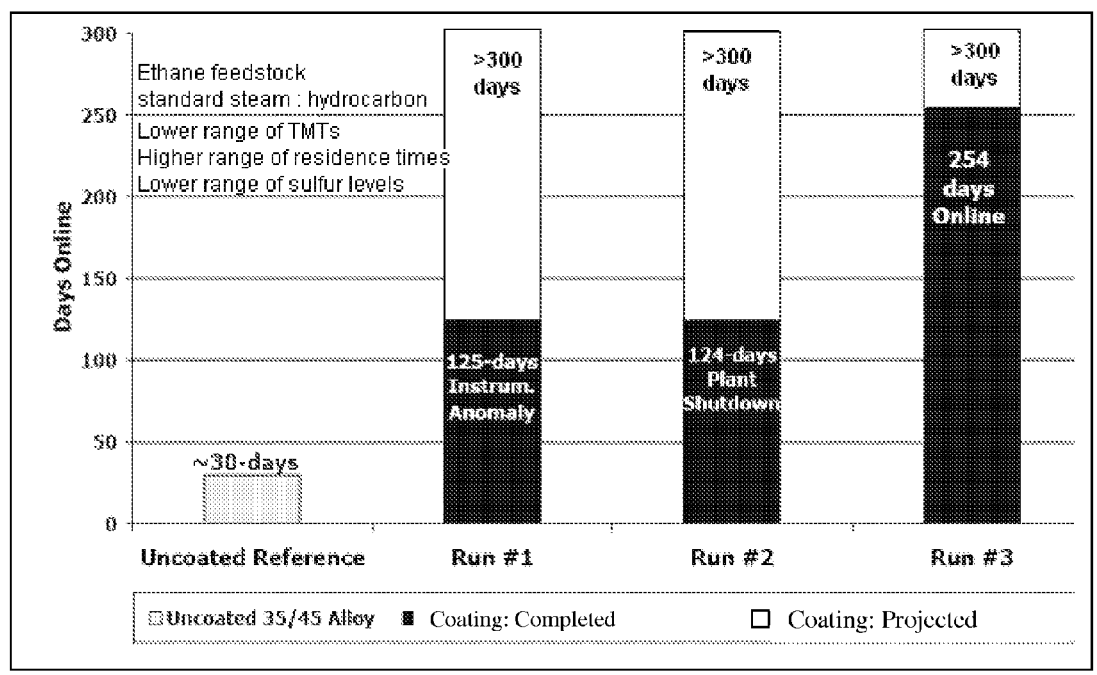
FIG. 8 is a bar chart comparing the days online of an uncoated 35C5-45Ni—Fe alloy with three samples of an embodiment.

FIG. 8 is a bar chart comparing the results of experiments of three samples of an embodiment with a conventional uncoated 35Cr—45Ni—Fe alloy furnace coils. Conventional furnace coils used in ethane processing can only stay online for approximately 30 days before being clogged with coke. The first sample ran for 125 days before being shut down for an unrelated instruments anomaly. Analysis of the furnace coils indicated a projected service life of over 300 days. The second sample ran for 124 days before being shut down for a plant shutdown. Analysis of the furnace coils indicated a projected service life of over 300 days. The third has run for 254 days and is also projected to have a service life over 300 days without the need to de-coke.

Figure 9:
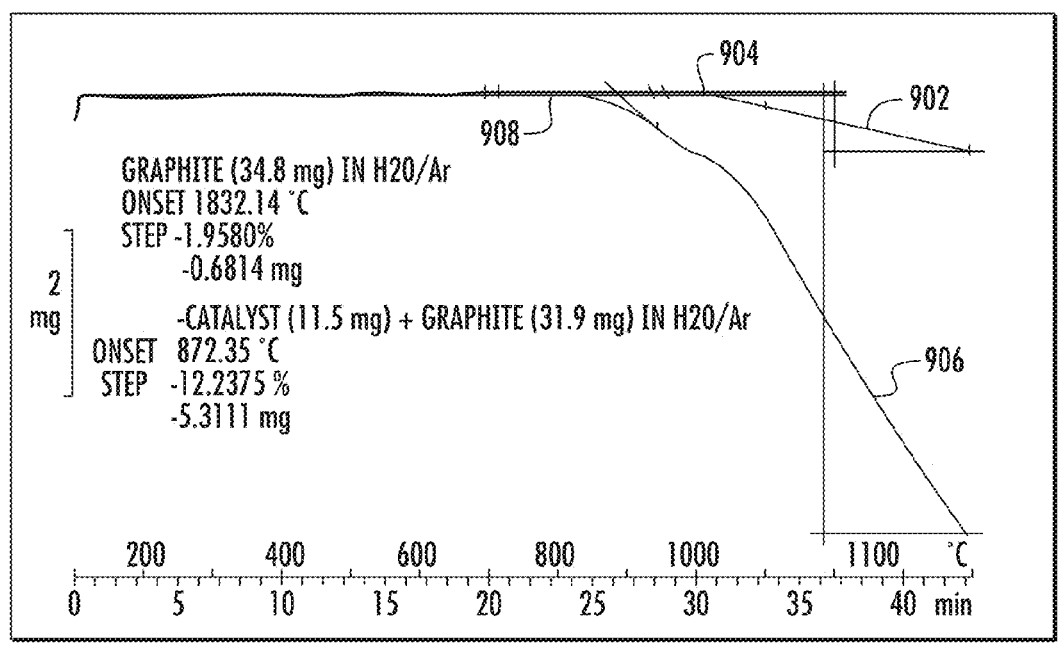
FIG. 9 is a plot illustrating a thermogravimetric analysis (hereinafter "TGA") comparison of an embodiment with an uncoated substrate.

FIG. 9 is a plot illustrating a TGA comparison of an embodiment with an uncoated substrate. The coating 100 of this embodiment included $CaWO_4$ or $Ba_3Y_2WO_9$, in addition to manganese and chromium-manganese oxides. The time-temperature ramp is shown on the x-axis. The y-axis shows the weight loss of graphite due to gasification. The test atmosphere was steam/argon which provided an overall low oxidizing potential. The top profile 902 is a reference run with graphite and no catalyst and shows an Onset Temperature of Gasification of ~1032° C. (1890° F.) 904. The lower profile 906 is graphite plus catalyst showing an Onset Temperature of Gasification of ~872° C. 908 and higher gasification rate.

Example 1

Laboratory-scale Demonstration of Gasification of Carbon (for W-based Oxide Surfaces)

This example demonstrates the catalytic function of the Mn-based components in promoting carbon gasification. The tests were conducted on a Mettler-Toledo TGA/SDTA 850 system under a controlled atmosphere. Commercial Graphite powder (CERAC, 99.5% purity, −325 mesh) was used as the carbon indicator. In each test, the graphite powder and the powder of the testing sample were weighed and blended in an alumina crucible, and then placed onto the sample holder of the Mettler-Toledo TGA/SDTA 850 system. During the test the sample temperature was program controlled and monitored, and the sample weight was continuously measured and plotted as a function of temperature and time. The onset temperature of the TGA curve indicates the initial temperature of the carbon gasification event, and the step size indicates the amount of the weight loss of the graphite powder that is the amount of graphite has been gasified. Runs with graphite powder without adding Mn-based-components were used as non-catalytic carbon gasification references.

Figure 10:
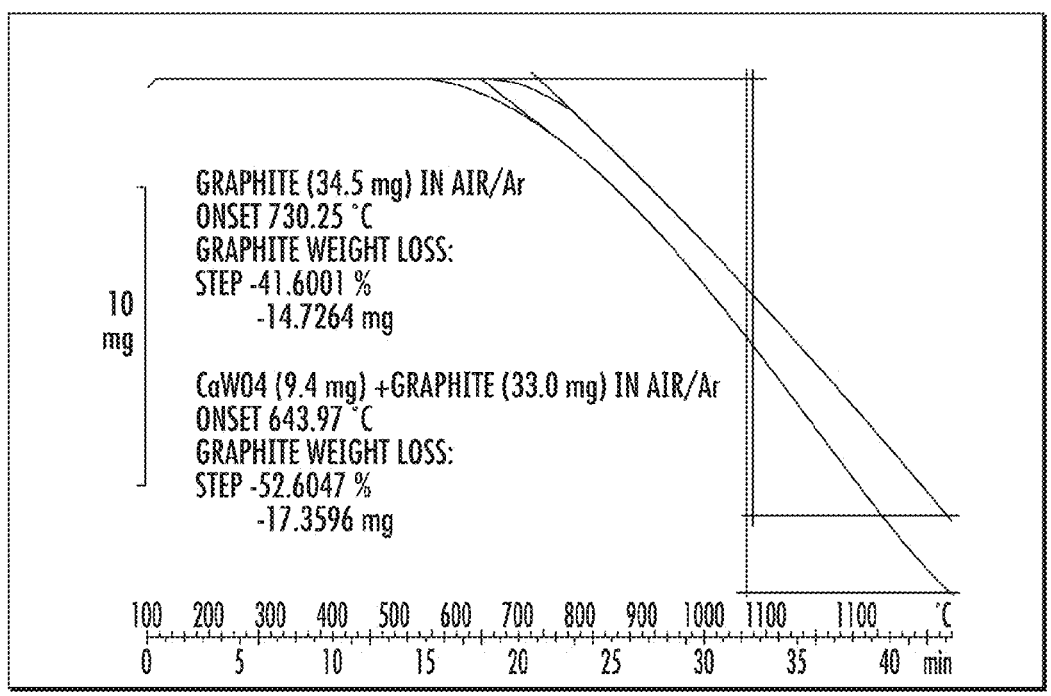
FIG. 10 shows TGA curves of the blended $CaWO_4$/graphite sample and the graphite reference sample collected in an atmosphere of 10 ml/min air and 38 ml/min Ar.

Graphite and blended $CaWO_4$/graphite samples were tested under an atmosphere of high oxidation potential (10 ml/min Air and 38 ml/min Ar), with a temperature program of ramping from 100 to 1100° C. at a rate of 30° C/min and holding at 1100° C. for 10 minutes. The results are shown in FIG. 10. It shows that the TGA curve of the blended $CaWO_4$/graphite sample has a lower onset temperature and a larger weight loss step than the reference curve of graphite.

FIG. 10 shows TGA curves of the blended $CaWO_4$/graphite sample and the graphite reference sample collected in an atmosphere of 10 ml/min air and 38 ml/min Ar.

Figure 11:
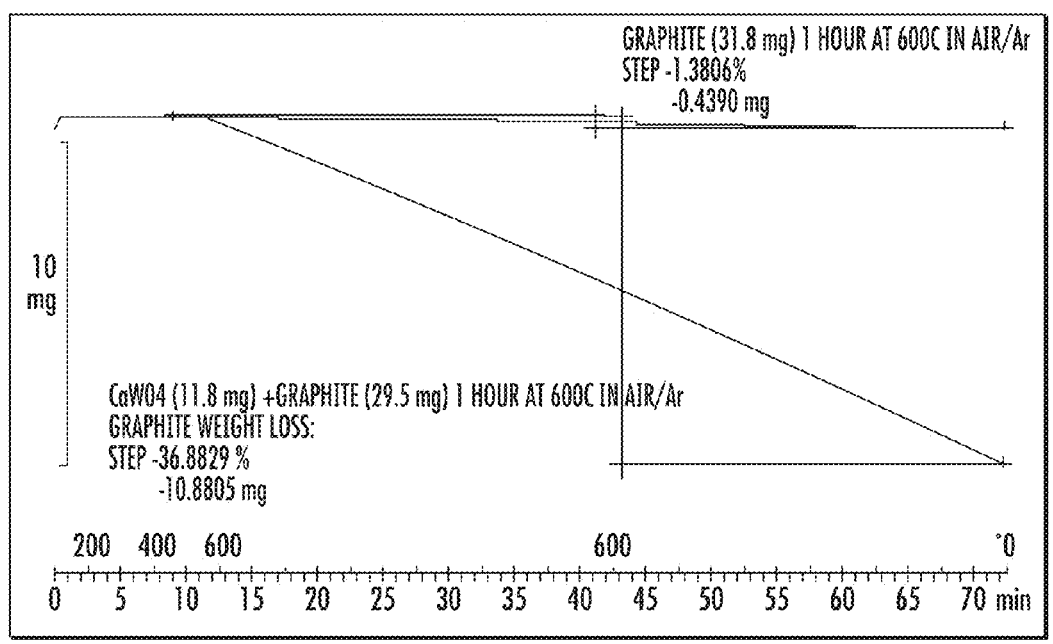
FIG. 11 shows TGA curves of the blended $CaWO_4$/graphite sample and the graphite reference sample at 600° C., under an atmosphere of 10 ml/min air and 38 ml/min Ar.

A separate set of experiments was carried out at 600° C. under the same high oxidation potential atmosphere for 1 hour. The results are shown in FIG. 11. It shows that the level of carbon gasification (graphite weight loss: 1.38%) under such conditions is insignificant without catalyst. The TGA curve of the blended $CaWO_4$/graphite sample shows a step of 36.88% graphite weight loss that demonstrates the catalytic activity of $CaWO_4$ at lower reaction temperature.

FIG. 11 shows TGA curves of the blended $CaWO_4$/graphite sample and the graphite reference sample at 600° C., under an atmosphere of 10 ml/min air and 38 ml/min Ar.

Figure 12:
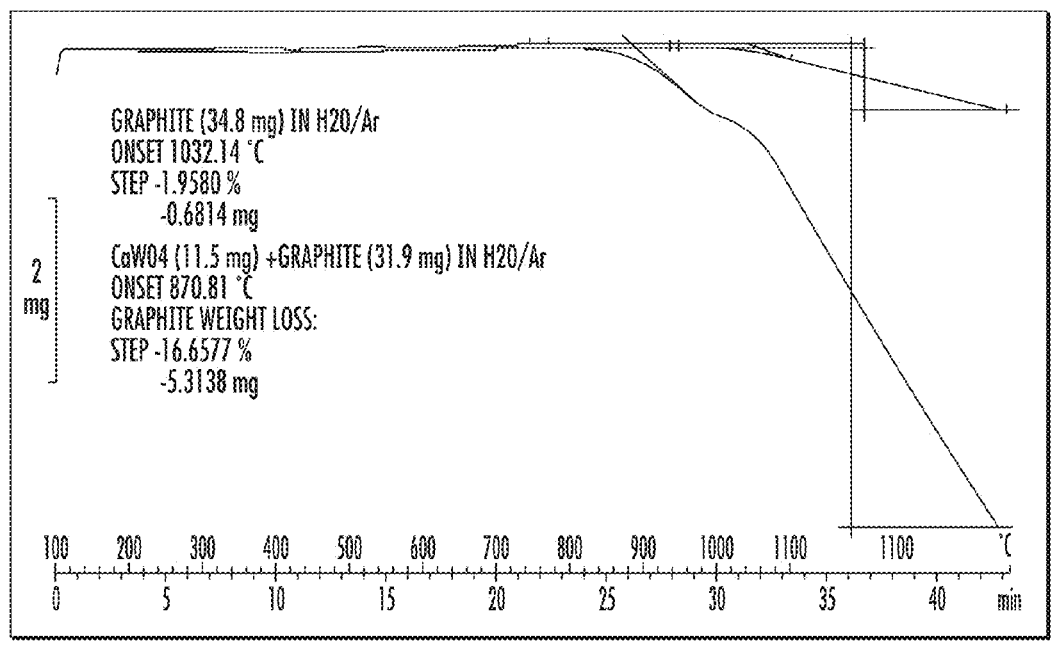
FIG. 12 shows TGA curves of the blended $CaWO_4$/graphite sample and the graphite reference sample collected under lower oxidation potential atmosphere, 2% $H_2O$ in Ar.

Lower oxidation potential tests were conducted with the addition of 2% $H_2O$ in Ar with a temperature program of ramping from 100 to 1100° C. in a rate of 30° C./min and holding at 1100° C. for 10 minutes. The results are shown in FIG. 12. Under such conditions, the onset temperature of the graphite reference sample is 1032.14° C., and the step of weight loss is only 1.96% while the blended $CaWO_4$/graphite sample shows a much lower onset temperature, 870.81° C., and a much larger step of weight loss, 16.66% that demonstrates the catalytic activity of $CaWO_4$ under lower oxidation potential atmosphere.

FIG. 12 shows TGA curves of the blended $CaWO_4$/graphite sample and the graphite reference sample collected under lower oxidation potential atmosphere, 2% $H_2O$ in Ar.

Example 2

Laboratory Demonstration of Surface Inertness to Filamentous Coke Generation

This example demonstrates the inertness of the invented coating (Mn-based surface). Coking resistance property has been tested on three Mn-based surface coating samples and three reference samples, alumina, oxidized KHR45A alloy, and nickel coupons. Among the three reference samples, nickel is a well known catalyst for making filamentous coke, and alumina represents an inert surface to coke formation. KHR45A is a high temperature alloy with the composition of 35% Cr—45% Ni—Fe (balance). It was pre-oxidized at 850° C. in air for 8 hours to generate a surface dominated with chromium oxide, $Cr_2O_3$ that is inert to catalytic coke formation. The three Mn-based surface coating samples doped with 3.81, 7.62 and 15.42 wt % Mn were also oxidized under the same conditions to generate manganese oxide surfaces.

Figure 13:
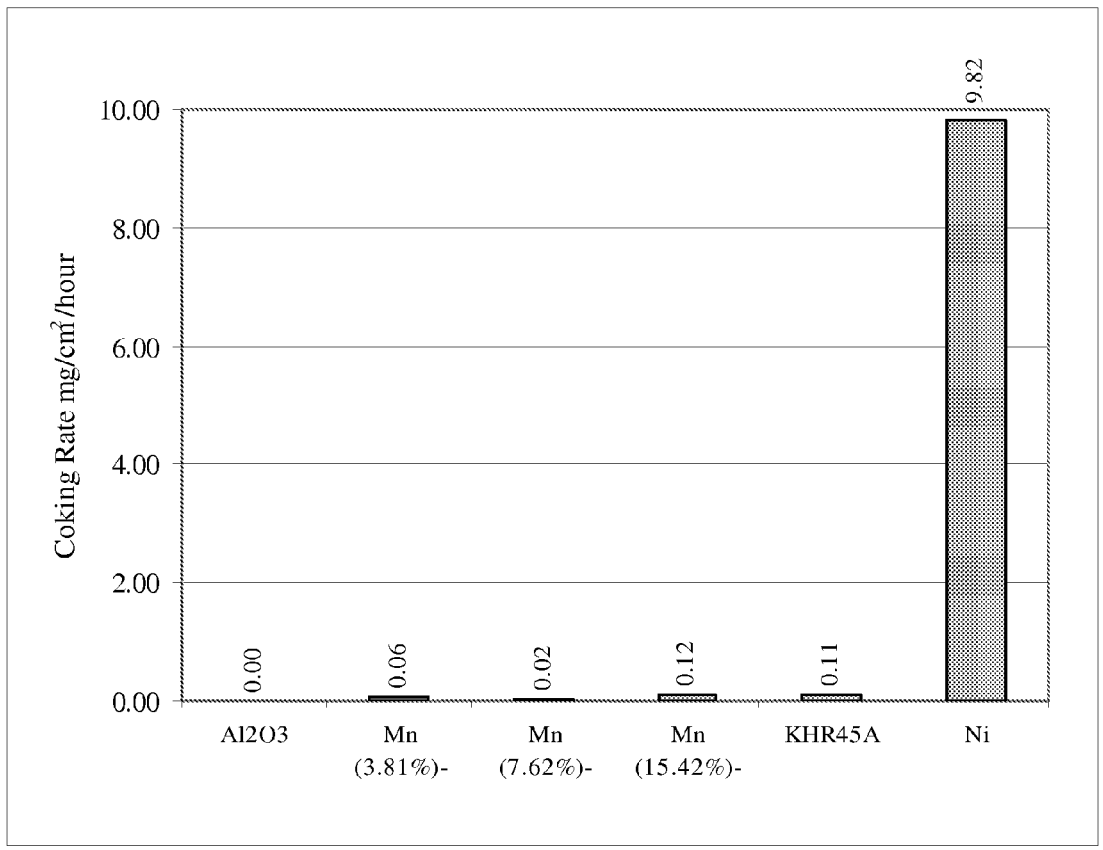
FIG. 13 shows coking resistance of the present coatings for ethane cracking compared to monolithic alumina, a chromia-based surface (on KHR45A alloy—a 35Cr-45Ni—Fe alloy) and nickel.

The coking resistance evaluation test was carried out at a bench-top steam pyrolysis test rig with the six sample coupons placed in the center of a quartz tubular reactor. With Ar purging, the reactor was heated in a furnace set at a temperature of 800° C. Upon reaching set temperature, steam and ethane was introduced into the reactor at a rate of 100 ml/min ethane with the ratio of steam to ethane controlled at 1 to 3. After a run of 1 hour, the feeding of ethane and steam was discontinued, and the reactor was cooled down with Ar purging. Upon the termination of the run, it was evident that substantial coke was accumulated on the surface of the nickel sample but not on the rest of the samples. The weight increase of sample reflects the amount of coke deposits on its surface and thus was used for coking rate calculation. The test results, listed in Table 4 and plotted in FIG. 13, show that the inertness of the invented coatings is compatible to alumina and chromium oxide surfaces.

TABLE 4

| Materials | Testing Surface | Surf. Area ($cm^2$) | Coking Rate mg/$cm^2$/hour |
|---|---|---|---|
| $Al_2O_3$ | $Al_2O_3$ | 3.85 | 0.00 |
| Mn (3.81%) | $Mn_2O_3$ | 5.00 | 0.06 |
| Mn (7.62%) | $Mn_2O_3$ | 5.07 | 0.02 |
| Mn (15.42%) | $Mn_2O_3$ | 5.01 | 0.12 |
| KHR45A | $Cr_2O_3$ | 5.43 | 0.11 |
| Ni | Ni | 2.40 | 9.82 |

Example 3

Figure 14A:
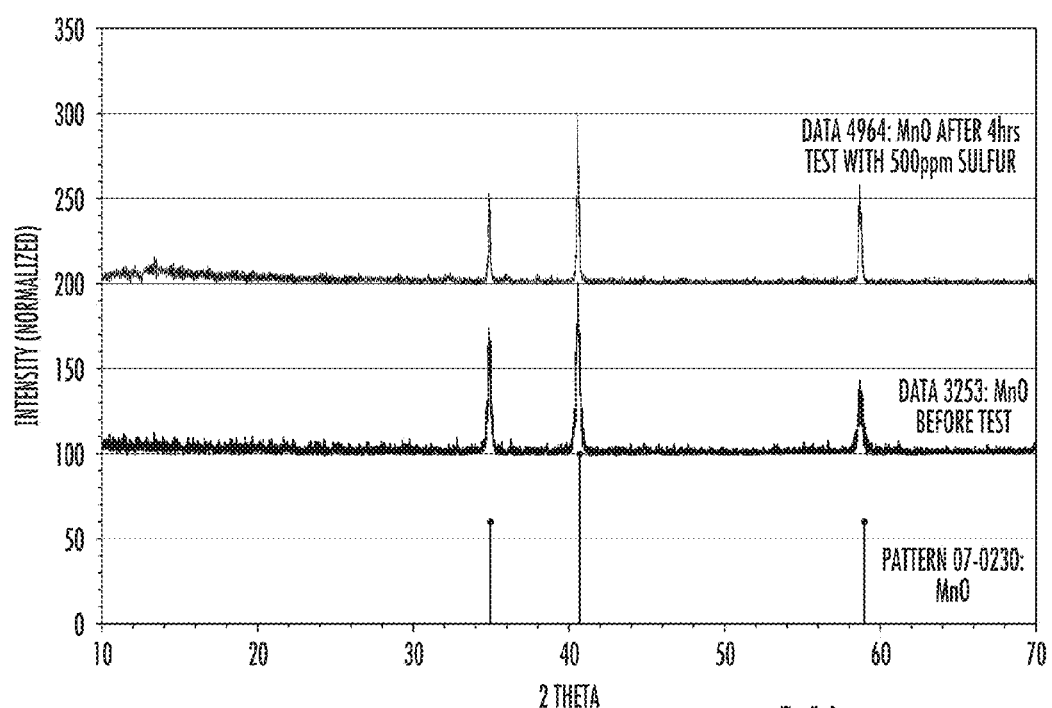
FIG. 14(a), FIG. 14(b), FIG. 14(c), and FIG. 14(d) show graphs of the laboratory evaluation of the stability of candidate catalysts under sulfur exposure at elevated temperatures.
Figure 14B:
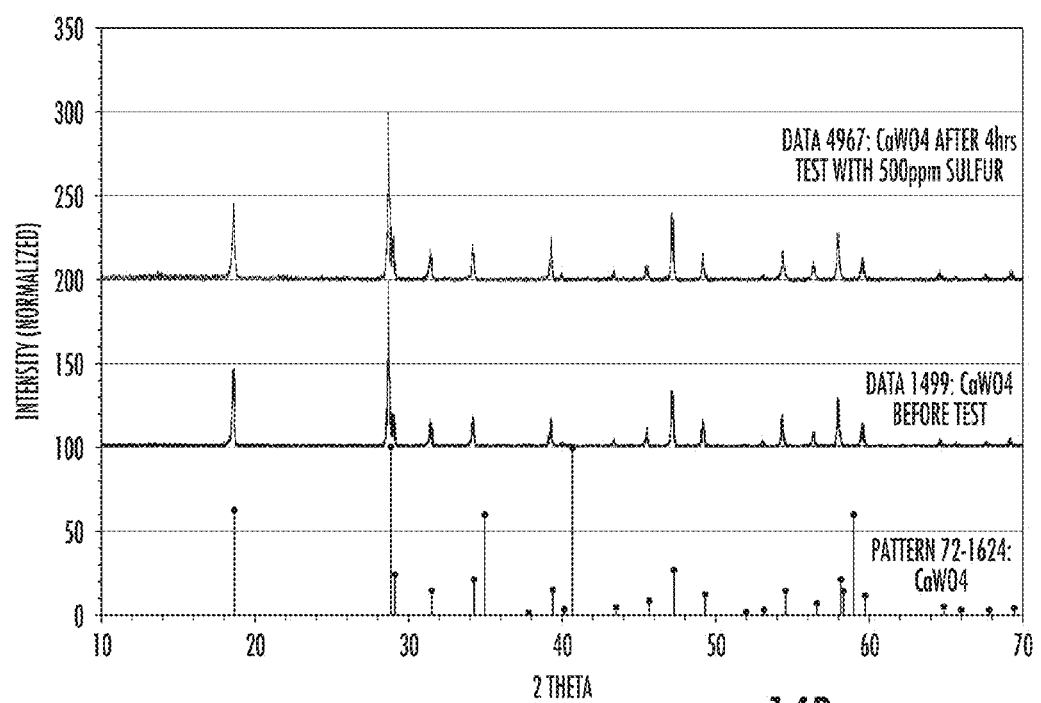
Figure 14C:
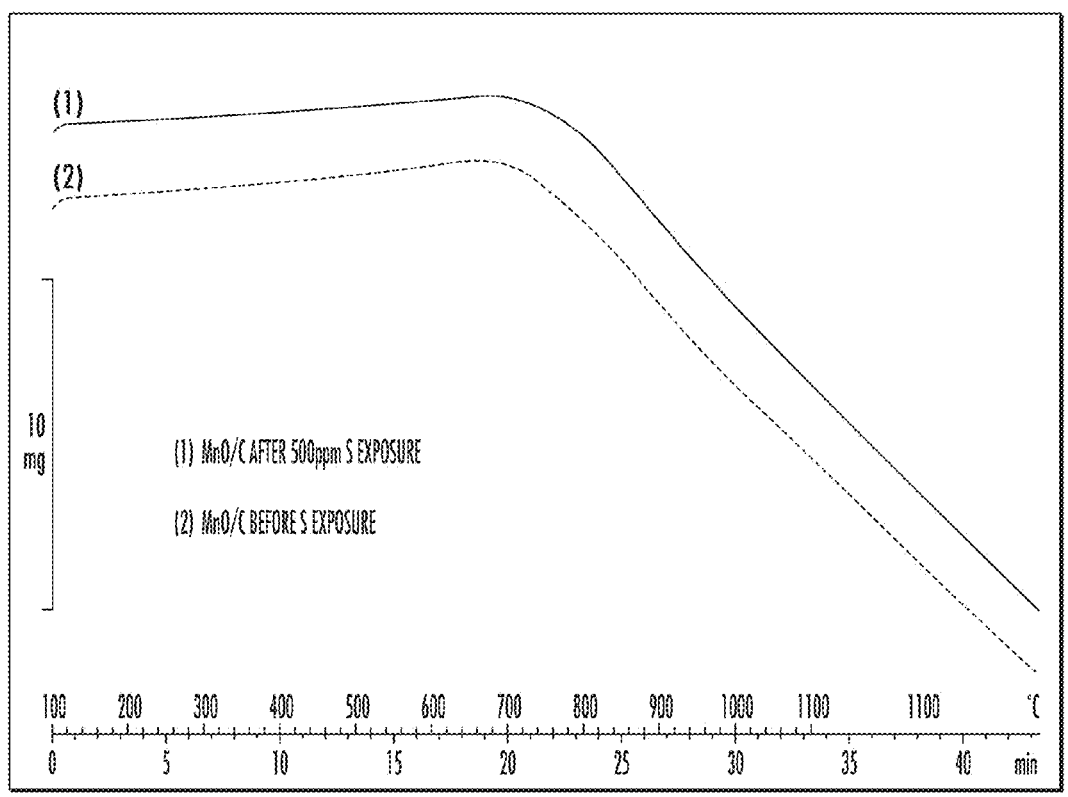
Figure 14D:
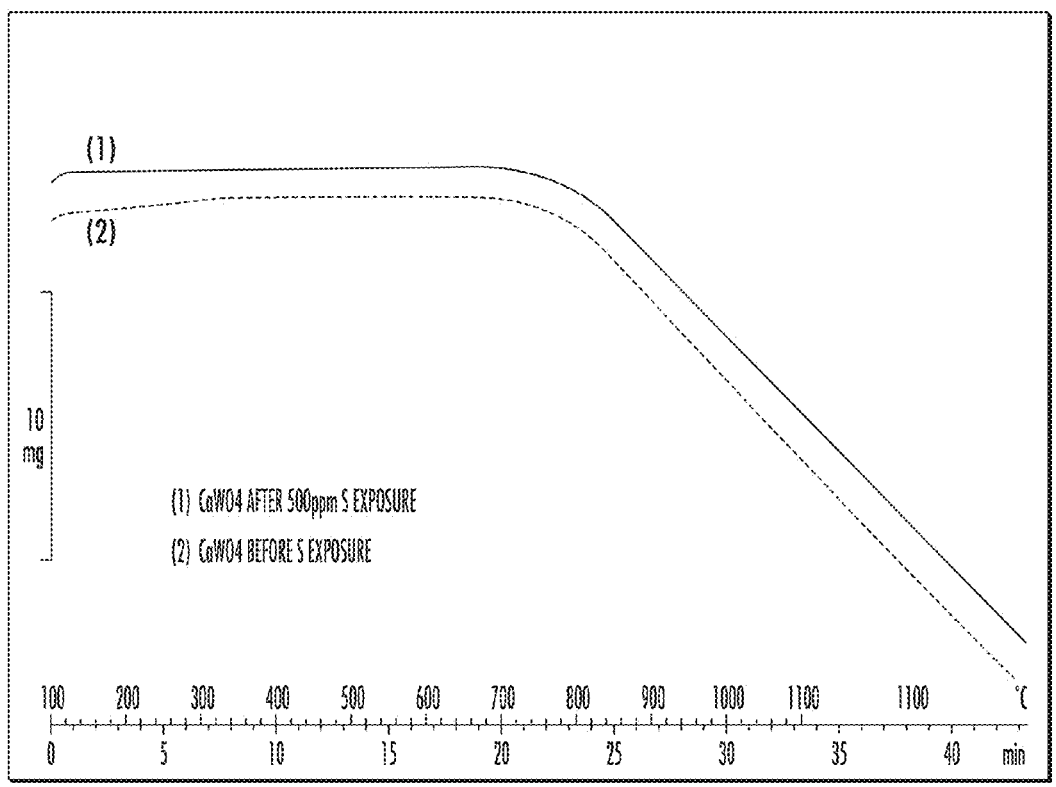

Stability of Catalyst Materials Under Elevated Temperature, High Sulfur Exposure Showing: (a) by XRD, No Changes in Crystal Structure or Decomposition; (b) by TGA, no Detectable Loss in Catalytic Efficacy of Gasification In this example the stability of candidate catalysts under sulfur exposure at elevated temperatures has been evaluated. Powder samples of candidate catalysts were treated in a tubular quartz reactor under an atmosphere of 25% $H_2O$ and 75% Ar. The reactor was heated in a furnace set to 900° C. Once reaching the set temperature, a syringe infusion pump fed dimethyl disulfide (DMDS) into the reactor providing 500 ppm sulfur in the gas stream. The duration of sulfur exposure was 4 hours and the sample temperature was monitored throughout the run with a thermocouple inserted inside the reactor and attached to the sample holder. All samples were examined by XRD and tested for carbon gasification activity, by the method described in Example 1 (the number to be changed along with the example's final location), before and after the sulfur treatment. The results of Mn-based candidate catalyst are shown in FIG. 14(a) and FIG. 14(c), and W-based candidate catalysts are shown in FIG. 14(b) and FIG. 14(d). There are no noticeable phase changes and carbon gasification activity changes for both Mn-based and W-based candidate catalysts.

Example 4

Thermal Stability of MnO Surface Under High Carbon Activity Conditions

In this example MnO has been evaluated for its thermal stability under high carbon activity conditions.

Figure 15A:
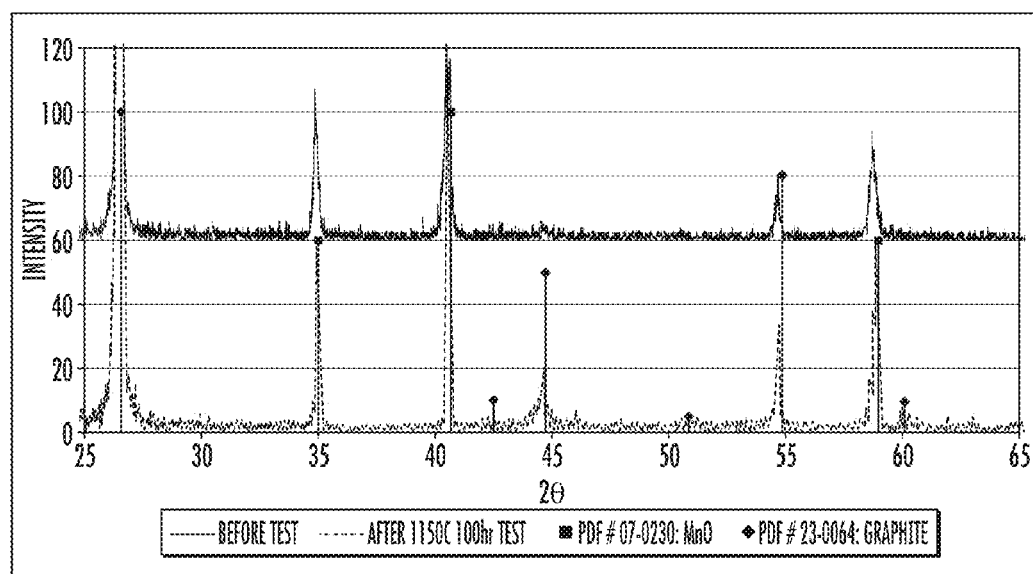
FIG. 15(a) shows a graph of XRD results of MnO sample before and after 1150° C. 100 hr test under high carbon activity condition.

The testing sample powder, MnO, was mixed with commercial graphite powder (CERAC, 99.5% purity, −325 mesh) in a ratio of 40 wt % MnO and 60 wt % Graphite and placed in a ceramic boat. Extra graphite powder was used to fully cover the top surface of the testing mixture to provide a testing environment of carbon activity, α=1. Following that, the boat was covered by an alumina plate and placed in the center of a tubular ceramic reactor. The test conditions were controlled at a pressure of 1-2 torr Ar with an Ar flow rate of 70-85 ml/min. The ceramic reactor was heated in a furnace programmed for 100 hours at 1150° C. The powder sample was examined by X-ray diffraction (XRD) analysis before and after the test, and the results are shown in FIG. 15 (a). It demonstrates that MnO is chemically and structurally stable after 100 hours at 1150° C. under high carbon activity.

Figure 15B:
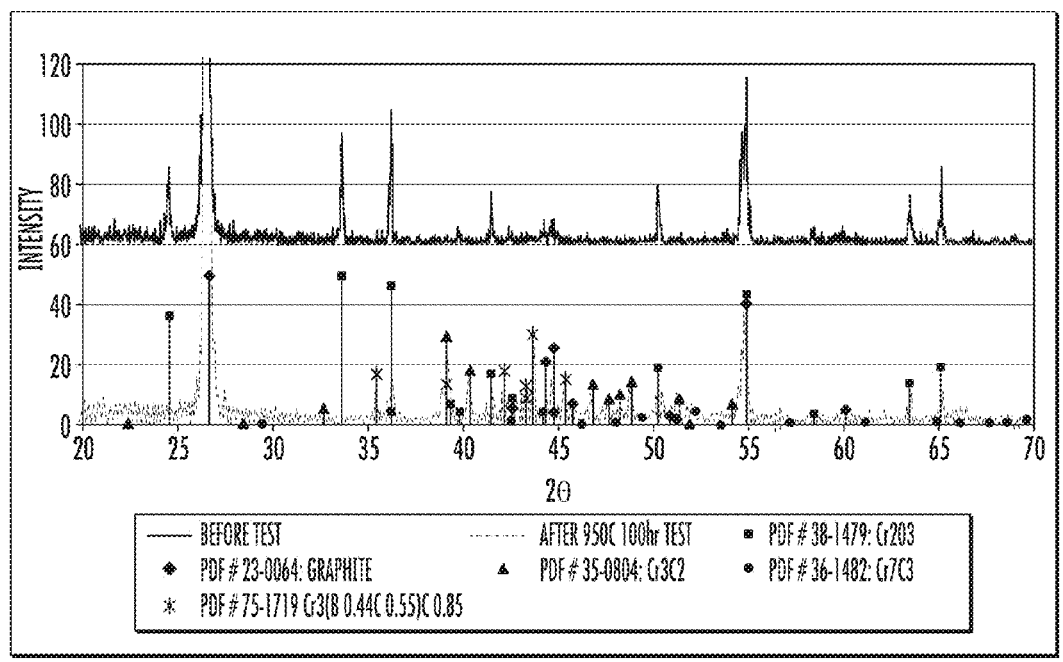
FIG. 15(b) shows a graph of XRD results of $Cr_2O_3$ sample before and after 950° C. 100 hr test under high carbon activity condition.
Figure 15C:
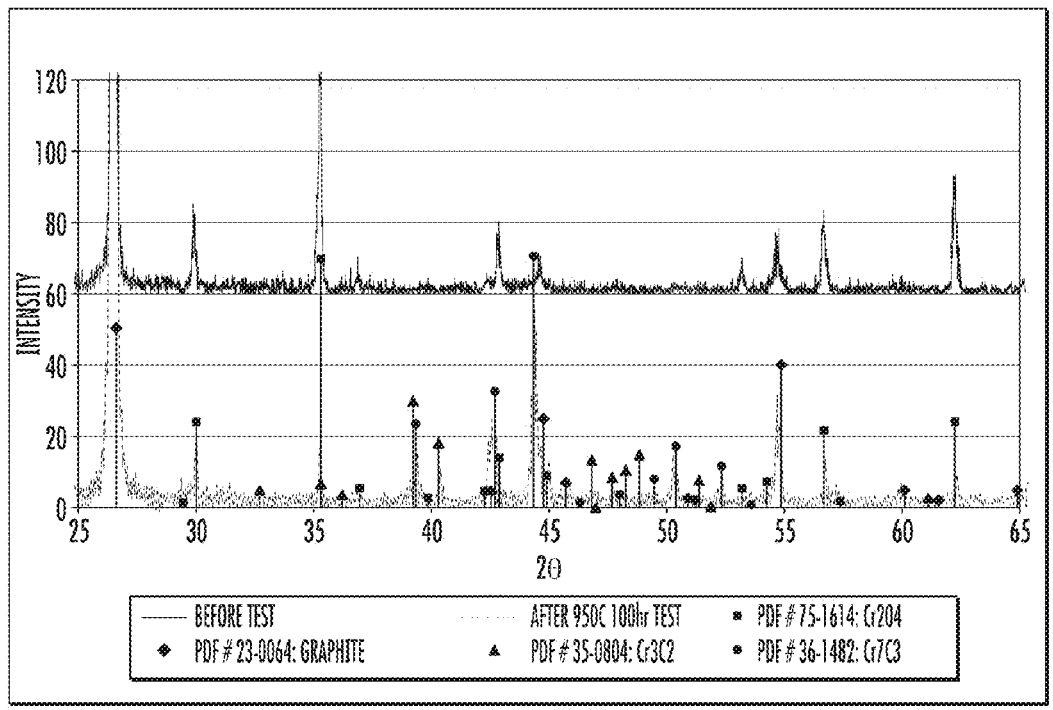
FIG. 15(c) shows a graph of XRD results of $MnCr_2O_4$ sample before and after 950° C. 100 hr test under high carbon activity condition

As comparison, the test results of reference samples, $Cr_2O_3$ and $MnCr_2O_4$, at 950° C. for 100 hours are shown in FIGS. 15(b) and (c), respectively. The formation of carbides has been detected for both reference samples. It can be concluded that the thermal stability of MnO under high carbon activity is at least 200° C. higher than that of $Cr_2O_3$ and $MnCr_2O_4$.

Figure 16:
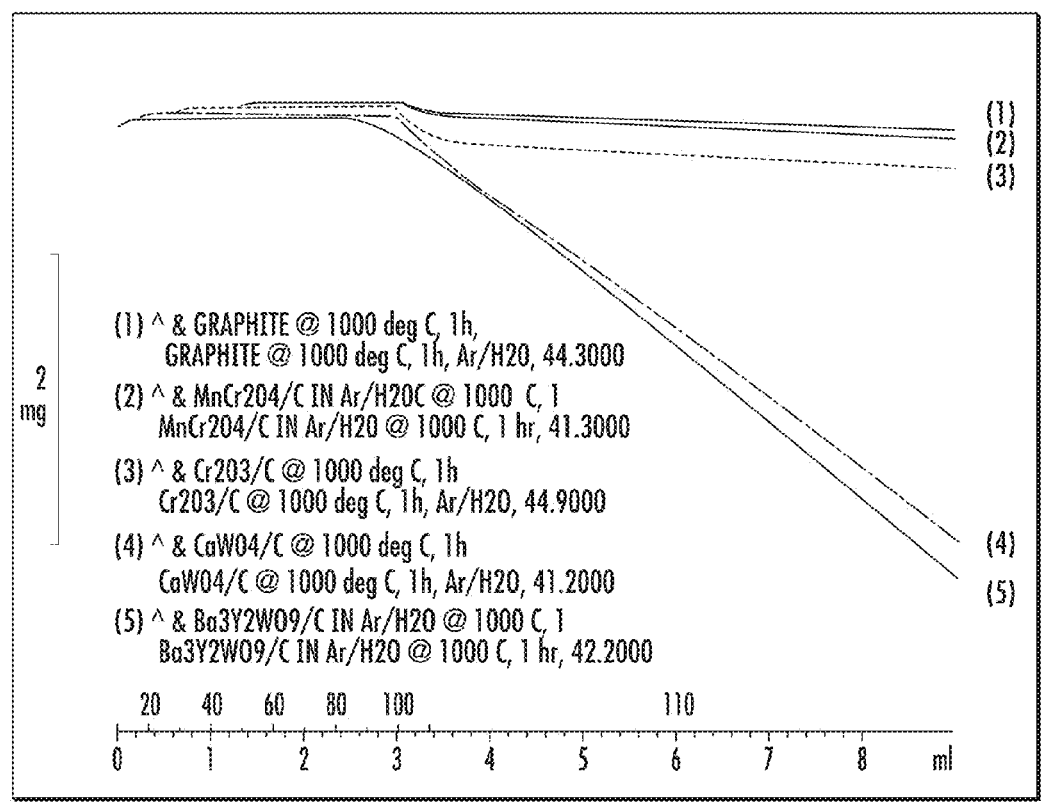
FIG. 16 shows a graph of the laboratory results of carbon gasification propensity of select reference materials, and the Mn-based and W-based catalyst species of this disclosure.

FIG. 16 shows a graph of the increased gasification of carbon of the CAMOL materials (4) & (5) when compared to other oxides found in the industry (2) & (3) and the reference (1).

FIG. 17(a) shows a table with an analysis of the effluent, including coke, of a reactor cracking ethane under standard conditions as indicated over two different high temperature alloys, one which is the typically used as a reference (Modified 35Cr-45Ni—Fe Alloy).

FIG. 17(b) shows a table with an analysis of the effluent, including coke, of a reactor cracking ethane under standard conditions as indicated over two different Mn-based catalyst surfaces. Both of these surfaces show significantly lower coke make when compared to the high temperature alloys in the table shown in FIG. 17(a).

The table shown in FIG. 18(a) shows an analysis of the effluent, including coke, of a reactor cracking a heavy liquid feedstock blend (as defined) under standard conditions as indicated over several different high temperature alloys, one which is the typically used as a reference (Modified 35Cr—45Ni—Fe Alloy). The machine polished surfaces show a lower coke production than the typical oxide based surface which is more indicative of the actual situation in industrial applications.

The table shown in FIG. 18(b) represents an analysis of the effluent, including coke, of a reactor cracking a heavy liquid feedstock blend (as defined) under standard conditions as indicated over two different Mn-based catalyst surfaces. Both of these surfaces show significantly lower coke make when compared to the reference high temperature alloy with oxide in the table shown in FIG. 18(a) while maintaining similar cracking product composition and yields.

Figure 19:
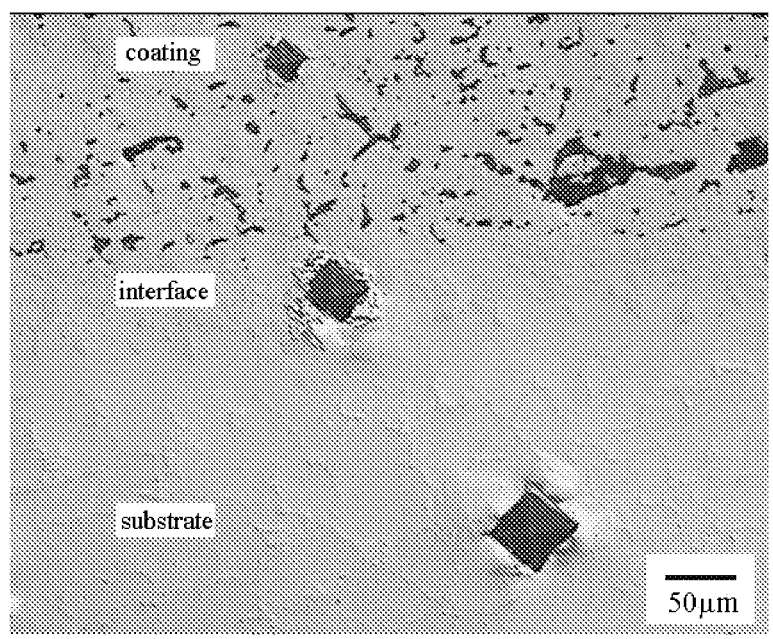
FIG. 19 shows a SEM of typical set of micro-hardness indentation ($H_v$4.9N) in the cross-sectional sample of the invented coating.

The SEM shown in FIG. 19 illustrates the integrated matrix of the coating with the high temperature alloy substrate after the second heat treatment process. This represents the typical result of the coating after the manufacturing process.

Figure 20A:
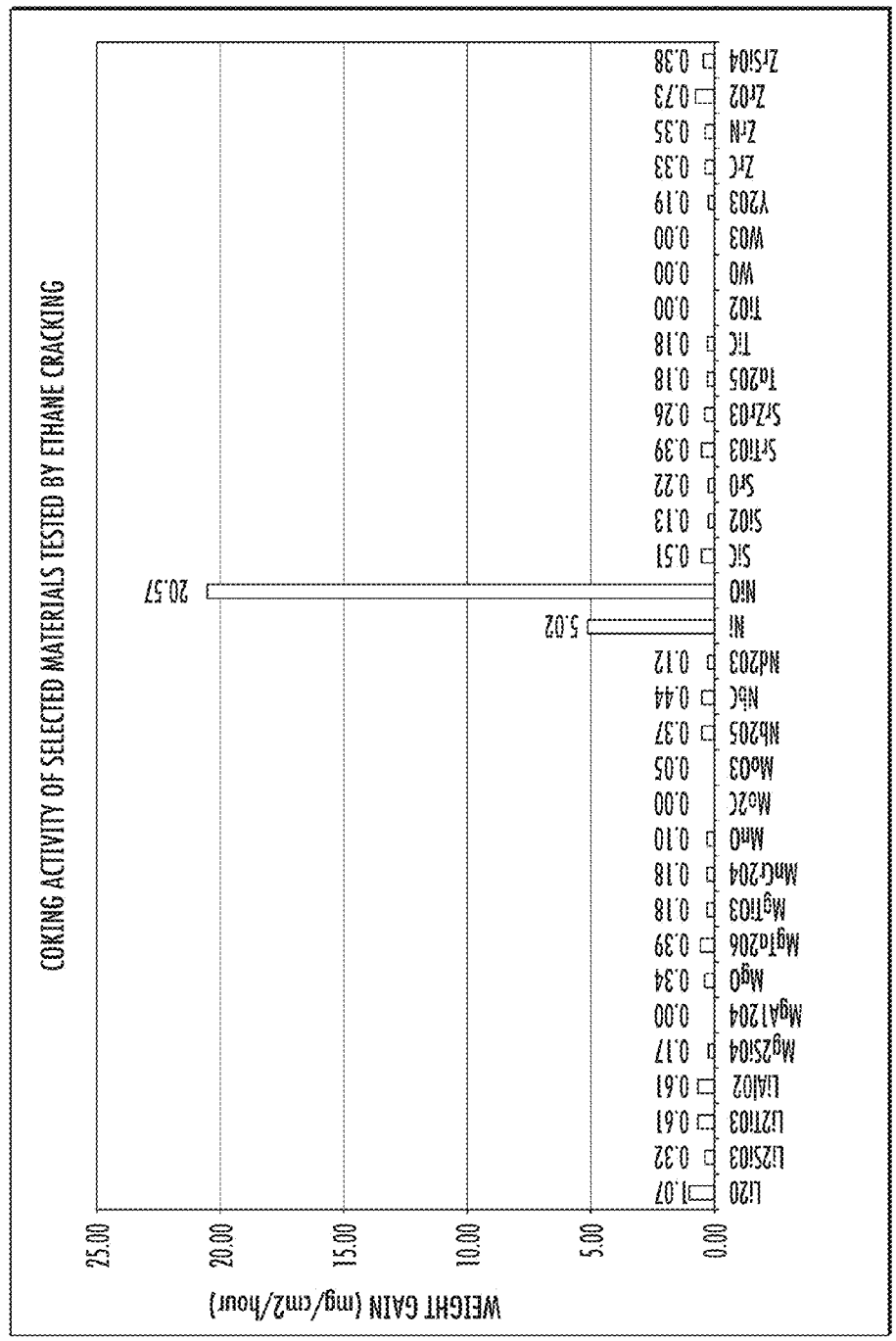
FIG. 20(a) and FIG. 20(b) show bar charts summarizing laboratory steam pyrolysis results using ethane feedstock of coupon samples.

FIG. 20(a) shows the coking potential of many oxides and metals in ethane cracking service. This shows that most oxides have a much lower coking potential than Iron and Cobalt-oxide, including the CAMOL oxides while maintaining similar cracking product composition and yields.

Figure 20B:
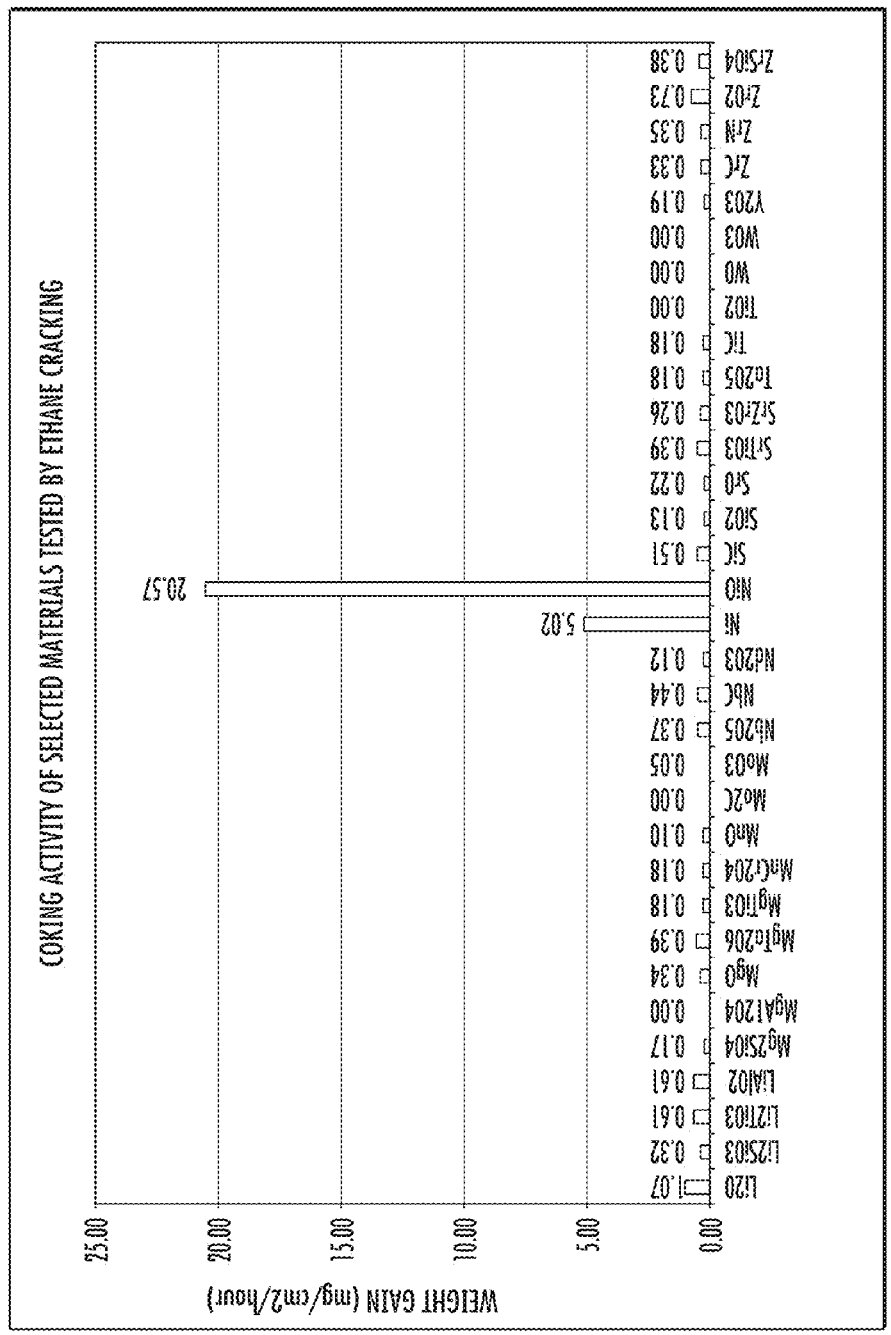

FIG. 20(b) shows the coking potential of different oxides, carbides and metals in ethane cracking service. This shows that most oxides have a much lower coking potential than Nickel and Nickel-oxide, including the CAMOL oxides while maintaining similar cracking product composition and yields.

Although the disclosure has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A coating composition comprising:
   a manganese oxide, a chromium-manganese oxide, or a combination thereof in a first region of a coating having a first thickness; and
   $X_6W_6(Si_z, C_{1-z})$ in a second region of the coating having a second thickness, wherein X is Ni or a mixture of Ni and one or more transition metals and z ranges from 0 to 1.

2. The coating composition of claim 1, wherein the second region has an overall composition comprising Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %.

3. The coating composition of claim 1, wherein the first thickness is 1-10 microns.

4. The coating composition of claim 1, wherein the second thickness is 200-500 microns.

5. The coating composition of claim 1, wherein the transition metal comprises Fe, Nb, Cr, Mn, Ti, Mo, W, and combinations thereof.

6. The coating composition of claim 1, wherein the coating further comprises $CaWO_4$, $Ba_3Y_2WO_9$, or combinations thereof.

7. A substrate coated with the coating composition of claim 1.

8. A substrate having a surface, wherein the coating composition of claim 1 is provided as a coating on the surface of the substrate.

9. The substrate of claim 8, wherein the coating has a thickness of 200-500 microns.

10. The substrate of claim 8, wherein the coating is a first coating provided adjacent the surface and a second oxide coating is provided on the first coating opposite the surface, the second oxide coating comprising a manganese oxide, a chromium-manganese oxide, or a combination thereof.

11. The substrate of claim 10, wherein the second oxide coating comprises a manganese oxide.

12. The substrate of claim 10, wherein the second oxide coating has a thickness of 1-10 microns.

13. The substrate of claim 10, wherein the second oxide coating further comprises $CaWO_4$, $Ba_3Y_2WO_9$, or a combination thereof.

14. The substrate of claim 8, wherein the substrate is made from austenitic steel, a nickel based alloy, an iron based alloy, and/or a nickel-iron based alloy.

15. A coating composition, comprising Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %.

16. The coating composition of claim 15, wherein the coating composition includes $X_6W_6(Si_z,C_{1-z})$, wherein X is Ni or a mixture of Ni and one or more transition metals and z ranges from 0 to 1, wherein the transition metal comprises Fe, Nb, Cr, Mn, Ti, Mo, W, or a combination thereof.

17. A method of preparing a coating on a substrate, comprising:
applying a coating on a surface of a substrate, the coating comprising Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %;
heating the coating in the presence of oxygen to form an oxide layer on a surface of the coating opposite the substrate surface, the oxide layer comprising a manganese oxide, a chromium-manganese oxide, or a combination thereof.

18. The method of claim 17, wherein heating the coating comprises heating the coating at a temperature of from 800° C. to 1100° C.

19. The method of claim 17, wherein applying a coating comprises providing a mixture of metal powders including Ni in a range of 10-45 wt %, Mn in a range of 1.5-12 wt %, Fe in a range of 2-10 wt %, Si and/or C in a range of 5-10 wt %, W in a range of 35-80 wt %, and Cr in a range of 0.5-5 wt %, Nb in a range of 0-2 wt %, and Ti in a range of 0-2 wt %, pre-conditioning at least a portion of the metal powders, applying the pre-conditioned metal powders as a coating to the surface of the substrate.

20. The method of claim 19, further comprising heating the coating in a vacuum or inert atmosphere to a temperature of from 900° C. to 1200° C. after the coating has been applied to the surface of the substrate to consolidate the coating with the substrate.

* * * * *